United States Patent
Beshai et al.

(10) Patent No.: US 6,339,488 B1
(45) Date of Patent: Jan. 15, 2002

(54) LARGE SCALE COMMUNICATIONS NETWORK HAVING A FULLY MESHED OPTICAL CORE TRANSPORT NETWORK

(75) Inventors: Maged E. Beshai; Frederick C. Livermore, both of Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/199,322

(22) Filed: Nov. 25, 1998

(30) Foreign Application Priority Data

Jun. 30, 1998 (CA) .............................................. 2242191

(51) Int. Cl.[7] .............................................. H04B 10/20
(52) U.S. Cl. ...................................... 359/119; 370/406
(58) Field of Search ................................ 359/119, 117, 359/115, 124; 370/406, 400

(56) References Cited

U.S. PATENT DOCUMENTS

| | | | |
|---|---|---|---|
| 5,418,779 A | * 5/1995 | Yemini et al. .............. 370/256 |
| 5,745,486 A | 4/1998 | Beshai et al. ............... 370/352 |
| 5,751,454 A | 5/1998 | MacDonald et al. ........ 359/119 |
| 5,760,934 A | 6/1998 | Sutter et al. ................. 359/119 |
| 5,760,935 A | 6/1998 | Sabry et al. ................. 359/123 |
| 5,802,043 A | 9/1998 | Skillen et al. .............. 370/258 |

OTHER PUBLICATIONS

Eric Livermore, et al., "Architecture and Control of an Adaptive High–Capacity Flat Network", IEEE Communications Magazine, May 1998, pp. 2–8.

* cited by examiner

Primary Examiner—Thomas Mullen
(74) Attorney, Agent, or Firm—Allan P. Millard

(57) ABSTRACT

A fully meshed telecommunications network based on an optical core transport network having a plurality of optical nodes is described. An electronic edge switch is connected to an optical node and dedicated channels are established between all the possible pairs of electronic edge switches through their associated optical nodes and the optical core transport network. Connection paths are set up using a channel or channels between a pair of electronic edge switches which perform major functions concerning connection routes, including rate regulation, path establishment, etc.

26 Claims, 26 Drawing Sheets

From node 2 to node 5

| 0 | 1 | 2 | 3 | 4 | 5 | 6 | 7 |
|---|---|---|---|---|---|---|---|
| 60 | 74 | ✕ | 75 | 64 | 100 | 74 | 62 |

80 Path cost index

| 200 | 320 | ✕ | 230 | 250 | 122 | 240 | 280 |
|---|---|---|---|---|---|---|---|

82 End-to-end vacancy

| 12000 | 23680 | ✕ | 17250 | 16000 | ✕ | 17760 | 17360 |
|---|---|---|---|---|---|---|---|

84 Weighted vacancy

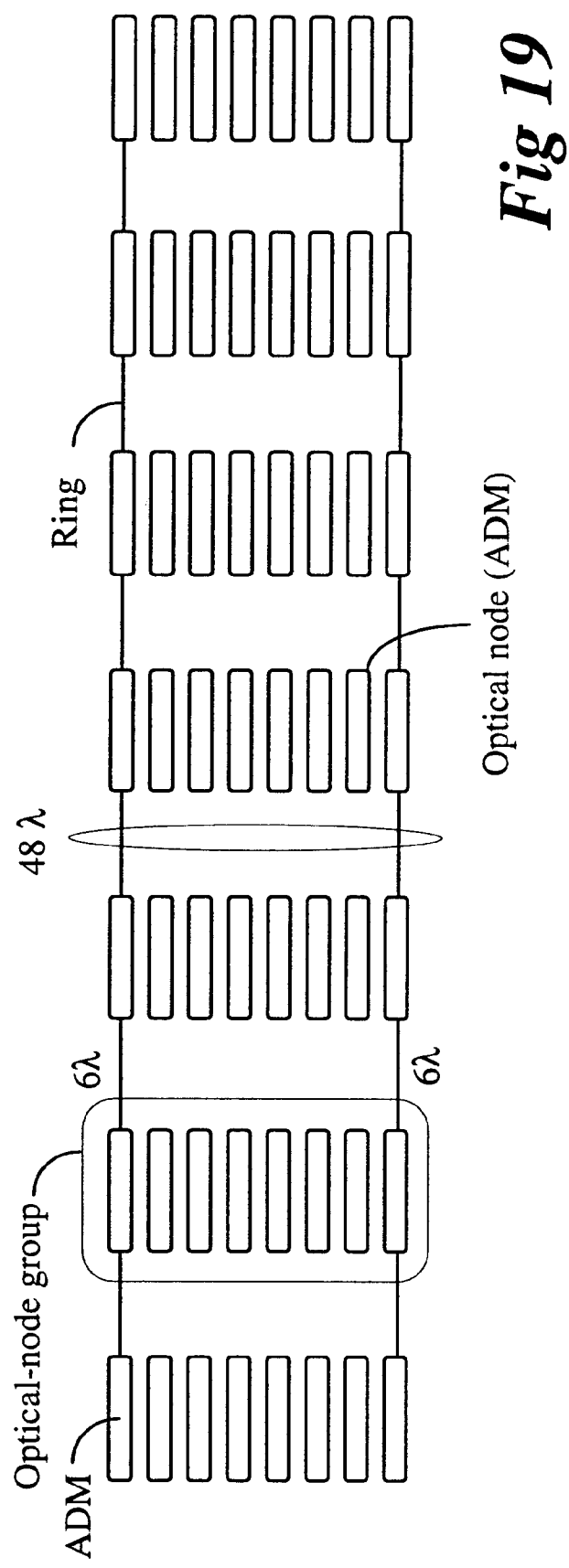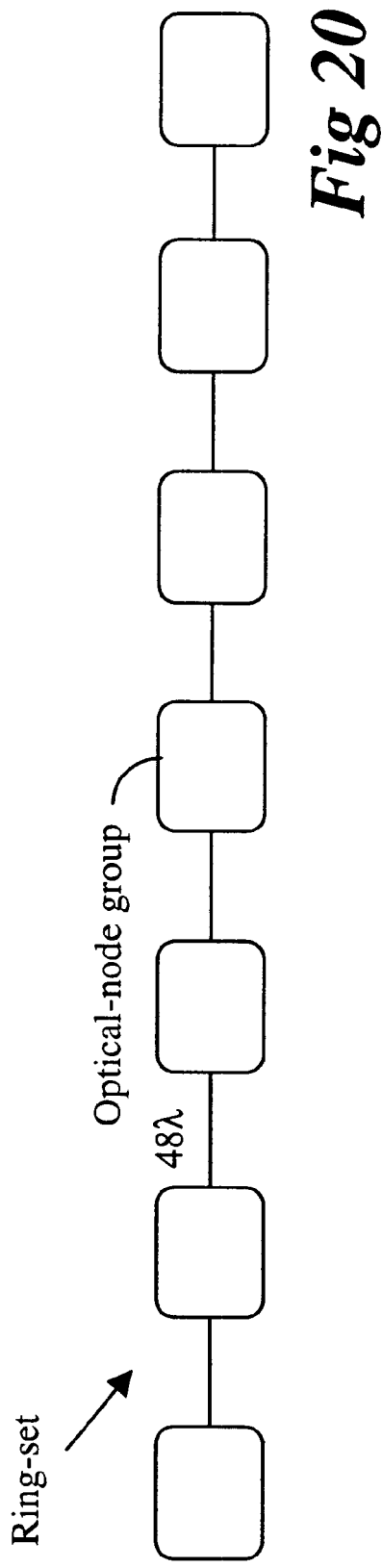
Fig 19
Fig 20

Through another electronic switch

Direct from originating electronic switch

LARGE SCALE COMMUNICATIONS NETWORK HAVING A FULLY MESHED OPTICAL CORE TRANSPORT NETWORK

FIELD OF INVENTION

The invention generally relates to a large scale telecommunications network employing an optical core transport network of a fully meshed configuration. In particular, it is directed to an architecture of a large scale telecommunications network in which electronic edge switches are connected to a fully meshed optical core transport network and major control functions of each connection are performed substantially by two electronic edge switches of the connection.

BACKGROUND OF INVENTION

The emerging data network must be able to grow to a much-higher capacity than the capacity of today's voice and data networks. In addition to the huge-capacity requirement, the emerging networks must provide diverse and versatile services. The multiplicity of connection protocols, and the effort required for their interworking, inhibit the ability of the network to provide service diversity. The simplest network would be fully connected, allowing every networking node to have a physical connection to every other networking node. However, as the network size grows, this fully-meshed structure rapidly becomes impractical. Due to the spatial variation of traffic loads, and the typically large modular sizes of transport links, a fully-meshed network normally leads to underutilized transport facilities.

Traditional electronic transport systems can offer a meshed network by providing direct interconnections between the networking nodes. However, the connections would be based on channelized time division multiplexing, where the bandwidth allocated to a node-pair is fixed and dedicated to the node-pair, resulting in inflexible bandwidth utilization. A fully-meshed network is not scaleable to cover a large number of nodes, unless the link capacities are elastic and can be modified rapidly to follow the traffic-demand variation. With fixed capacities and fluctuating traffic demand, the transport utilization drops rapidly as the number of nodes increases. An elastic network, however, would allow all the connections to share a common pool of capacity through paths whose capacities are dynamically adjustable.

Both cross-connection-based and ring-based networks can be configured to be fully meshed or almost fully meshed. Their transport mechanisms can also be optical or electronic or a mixture of both.

U.S. Pat. No. 5,802,043, issued Sep. 1$^{st}$, 1998, entitled "Transport Architecture and Network Elements", has an inventor common to the present application and describes one such solution based on an optical ring structure with capacity partitioning. In its realization, a domain is defined where every networking node within the domain is connected to every other networking node within it with fixed or variable capacity. All the connections within the domain share a common pool of capacity, maximizing the utilization of the node interfaces. Various networking nodes which use different protocols, such as ATM or IP, are accommodated by defining a container structure which carries digital information in its native form between them. The containers are carried on a digital facility with a defined bit rate that circulate on a ring or virtual ring past every networking node in the domain.

A pending U.S. patent application Ser. No. 09/116,477 entitled "Programmable Transport and Network Architecture" and filed on Jul. 16, 1998 with the common inventors extends further the meshed networking based on an optical ring configuration. The subject matter is described in an article "Architecture and Control of an Adaptive High-Capacity Flat Network" IEEE Communications Magazine, May 1998. The meshed network of this patent application allows all the connections to share a common pool of capacity through links among nodes whose capacities are dynamically adjustable. Nodes provide data packaging into "containers" of fixed or variable sizes for transport and a ring exchanges data containers among its nodes. A centralized or distributed controller calculates a service rate for each source-destination node pair. Such controller either monitors the traffic or receives updated capacity-allocation requests from the nodes, and assigns an appropriate data rate at which each node can transmit to each destination. With lossless rings (traffic-wise), the quality of service is controlled by the source and destination nodes, without any interference from other data streams within the network. By reducing the complexity of the network core, an economical, reliable, and manageable network with feature-rich edge nodes can be realized.

In the IEEE article referenced above, it was stated that: Unprecedented traffic growth is providing a huge demand for fiber facilities. Not only are the backbone networks outstripping their original design capacities, but the routes will need fiber cable replacements to allow full buildup of high-density WDM. In addition, as the routes grow, there will be further pressures to create better diversity to improve restoration. Currently, WDM is primarily used to increase point-to-point transport capacity. The abundance of transport bandwidth due to WDM may justify a highly-meshed topology at wavelength granularity. However, due to the spatial traffic variation and with wavelength switching, a wide-coverage network may still require tandem switching and capacity-sharing controls, which are now realized electronically. Two dimensional space-WDM switching nodes may be used to realize, at a wavelength granularity, either a partially-interconnected network or a fully-meshed network.

WDM stands for wavelength division multiplexing and refers to the technique of sending simultaneously a beam or beams of light of more than one wavelength through one optical fiber.

In U.S. Pat. No. 5,751,454 May 12, 1998, MacDonald et al, an optical ring network communication structure is described in which multiple wavelengths travel in one direction and wavelength Mux/Demux is performed at each node. In addition to being able to add and drop any wavelength, however, each node also has the ability to bypass selected wavelengths. By bypassing selected nodes, a direct channel of one wavelength can be provided between any node pair if the total number of nodes on the ring is relatively small.

U.S. Pat. No. 5,760,935 Jun. 2, 1998 Sabry et al describes an optical communications network in which information is transported through hierarchically configured networks via pixels in a discrete communications space defined by time and wavelength coordinates.

In U.S. Pat. No. 5,760,934 Jun. 2, 1998 Sutter et al describe an optical ring network using wavelength division multiplexing technique.

Generally speaking, a network with N nodes requires a minimum of N(N-1) paths to achieve a fully meshed configuration, where there is always a dedicated path available in each direction for each of a node pair. For example, in the case of 7 nodes in a network, 42 unidirectional paths are needed for all the possible node pairs, resulting in 21 bidirectional paths.

According to a broad aspect, the present invention realizes a fully meshed network, which provides an end-to-end path of an arbitrary capacity for each node pair. The capacity of each path may be dynamically modified in response to traffic loads and other network conditions. Each node must then sort its traffic according to destination, into logical buffers, and regulate the rate at which traffic is sent from each buffer.

In U.S. Pat. No. 5,760,934 Jun. 2, 1998 Sutter et al describes an optical ring network using wavelength division multiplexing technique.

OBJECTS OF INVENTION

It is therefore an object of the invention to provide a fully meshed telecommunications network in which an optical core transport network is used and a channel is managed by a pair of electronic edge switches at the ends of the channel.

It is a further object of the invention to provide a fully meshed telecommunications network in which an optical dual ring is used as the core transport network and a channel is managed by a pair of electronic edge switches at the ends of the channel.

It is another object of the invention to provide a fully meshed telecommunications network in which an optical dual ring is used as the core transport network and carries wavelength multiplexed optical signals.

It is yet an object of the invention to provide a fully meshed telecommunications network in which an end-to-end rate regulation is performed between a pair of electronic edge switches.

It is still a further object of the invention to provide a fully meshed telecommunications network in which a multiple of optical dual rings, operating in parallel, is used as the core transport network and carries wavelength multiplexed optical signals.

BRIEF DESCRIPTION OF DRAWINGS

FIG. 19 shows one embodiment of the multiple ring architecture.

FIG. 20 is an illustration of a group of multiple optical nodes in one ring set.

DETAILED DESCRIPTION OF PREFERRED EMBODIMENTS OF INVENTION

Figure 1:
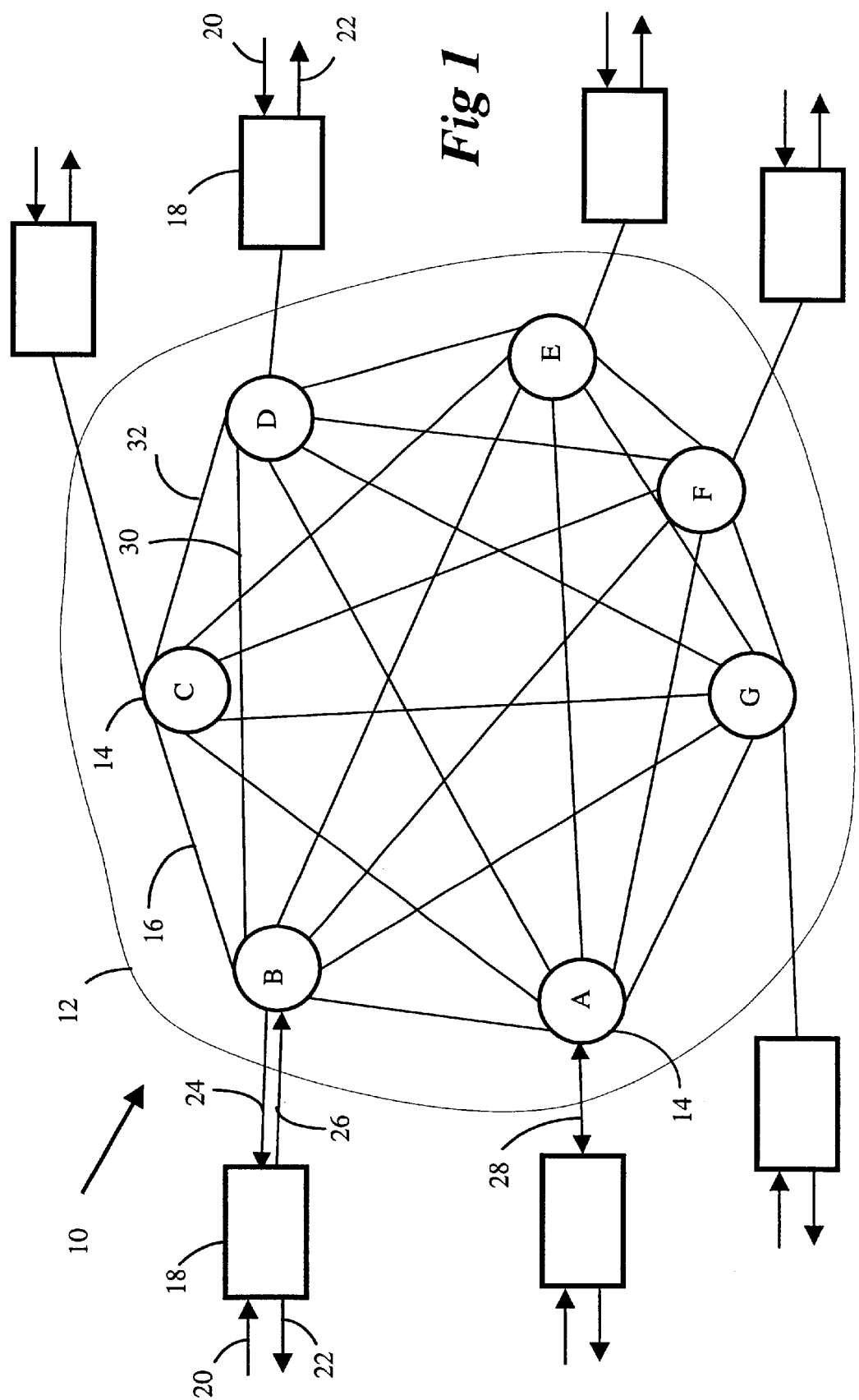
FIG. 1 is a schematic of an optical core-electronic edge network 10 in accordance with one embodiment of the invention.

Although as mentioned earlier, a fully meshed transport core network can be realized electronically, optically, or in a combination of both, an optical construction is becoming more prevalent in future network architecture and it is natural to use optical arrangement for the core network for the present invention. FIG. 1 is a schematic of an optical core-electronic edge network 10 in accordance with one embodiment of the invention. The network 10 comprises an optical core transport network 12 having a number of optical nodes 14 which are fully interconnected (meshed) by optical links 16. Each optical link supports at least one dedicated channel and therefore, each optical node is connected to each other optical node by at least one dedicated channel. A number of electronic edge switches 18, each connected to an optical node 14, interface between the network 10 and any external networks or terminals. In one particular embodiment, each optical link can be realized by a multi-wavelength optical circuit which supports a multiple of wavelengths, one wavelength constituting a dedicated channel. The entire optical core transport network is passive in the sense that no dynamic routing of channels, signal conversions, such as wavelength conversion etc., take place.

Each electronic edge switch 18 receives digital traffic from local sources through incoming access links 20 and delivers data destined to local sinks through outgoing access links 22. Each electronic edge switch connects to an optical node through optical circuits 24 and 26 (or a bidirectional circuit 28) which support a number of channels. Therefore the dedicated channel between any pair of optical nodes can extend to their associated electronic edge switches, resulting in at least one dedicated channel between any pair of electronic edge switches. The optical nodes thus only shuffle respective channels received from their electronic edge switches to respective optical nodes. It is therefore noted that an optical node can be an optical shuffler, an optical ADM (add/drop multiplexer) or an optical space switch. Optical WDM add/drop multiplexers are now readily available and come with a variety of capabilities in that with x+y wavelengths in a WDM link, an ADM adds or drops x wavelengths and passes through y wavelengths. The use of optical space switches instead of simple shufflers or ADMs increases the network efficiency at the expense of control complexity. In the following description, only channel shufflers or ADMs will be considered and described. In terms of function, channel shufflers and ADMs are very similar and therefore they are used synonymously in the specification.

While at least one direct channel is provided between any pair of electronic edge switches, it is possible to establish a path between the electronic edge switches using the direct channel or multi-hop channel or a combination of both. A path may occupy all the bandwidth of the channel or a portion thereof, with remaining portion being assigned to a different path. A multi-hop channel involves one or more intermediate nodes and is formed in two or more sections (a section is a link between two successive optical nodes in a ring). Therefore referring to FIG. 1, a direct channel (or link) 16 spans between optical nodes B and C. A path can also be made between nodes B and C by using a multi-hop channel, involving a specifically dedicated channel 30 between nodes B and D and another specifically dedicated channel 32 between nodes D and C. Optical node D therefore receives traffic destined to node C through its channel dedicated between nodes B and D and according to a prior routing arrangement, its electronic edge switch returns the traffic onto a channel 32 dedicated between nodes D and C. While two or more intermediate nodes can be used, a maximum of two hops (with one intermediate node) is preferred, because it appears that three or more hop channels would unduly complicate the network management without apparent benefits.

Figure 2:
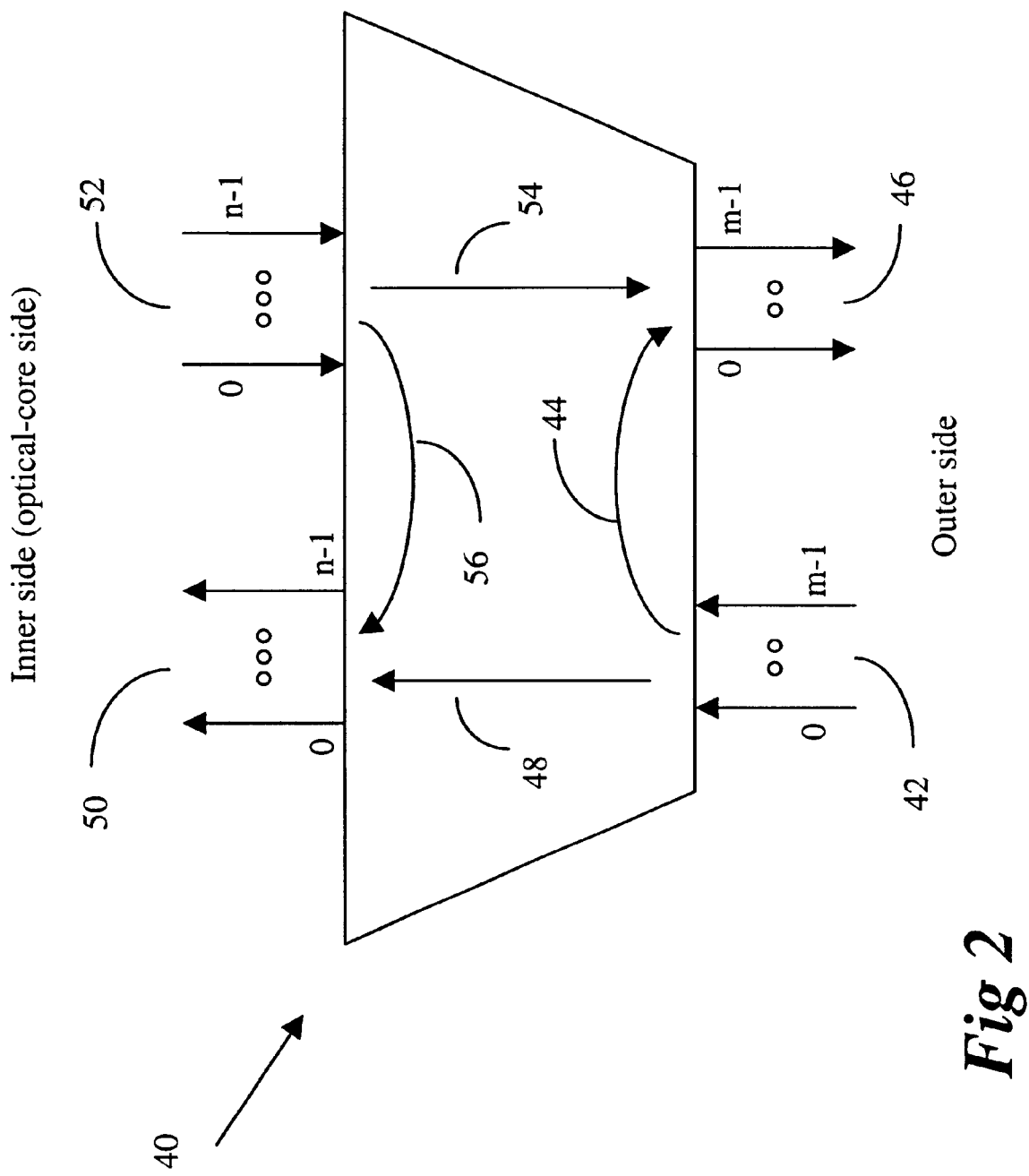
FIG. 2 is a schematic which illustrates the capacity usage of an electronic edge switch.

An edge switch takes in all the traffic from any local nodes and diverts some to the optical node (which is an optical shuffler or ADM) on the optical core and some other back to local nodes. It also takes in traffic from the optical shuffler or ADM on the core and diverts some to the local nodes and some other back to the core through the optical shuffler or ADM. One example is illustrated in FIG. 2. A channel is created between a pair of electronic edge switches. All the traffic control of the channel is performed by these pair of electronic edge switches, including rate control, QOS (quality-of-service) control, etc. Because the established paths are rate-regulated, in establishing individual connections within a path, the sending electronic switch in a two-hop channel need not be aware of the occupancy condition of the electronic switch associated with the intermediate optical node.

It is noted that the number of optical nodes per ring should be relatively small. The efficiency of the ring drops as the number of the optical nodes increases. The configuration described thus far, however, greatly simplifies packet processing in a data network and facilitates network scalability to hundreds of tera bits per second by connecting several rings in parallel. One of the advantages of this architecture is the effective sharing of the optical core capacity. Only a global traffic overload can lead to a noticeable delay. Global overload in any network, particularly a network of wide geographical coverage, is a rare event and—even then—the performance with the proposed architecture is acceptable. Under typical overload conditions good performance is realizable with an efficient routing method.

FIG. 2 illustrates in detail the traffic flow within an electronic edge switch 40. The traffic received from an ingress port 42 may be split into two streams, a stream 44 directed to egress ports 46 of the same switch, and another stream 48 directed towards the optical core through ports 50. The traffic received from a port 52, incoming from the optical core, may be split into two streams, a stream 54 directed towards the egress ports 46, and another stream 56 returning to the optical core and directed to various destinations.

If each electronic edge switch connects only to one optical node, then, in a network of N electronic edge switches, N being an integer greater than unity, the set of paths from an electronic edge switch to another electronic edge switch includes one direct channel and (N-2) two-hop channels.

Figure 3:
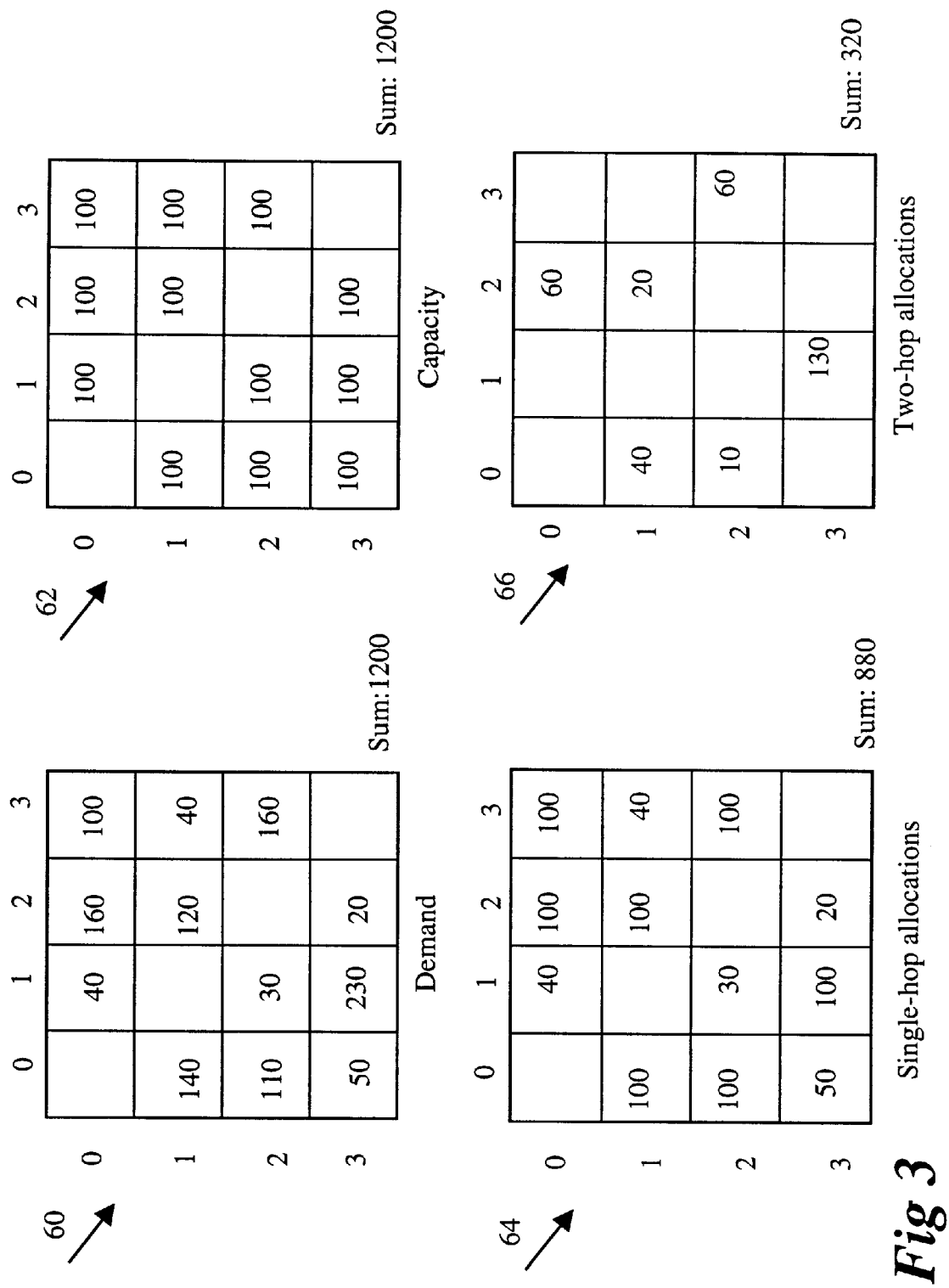
FIG. 3 illustrates the traffic distribution, using a simple case of four electronic edge switches.

FIG. 3 illustrates the traffic distribution, using a simple case of four electronic edge switches (switch 0–switch 3). Only the case of single-access (where an optical node supports one electronic switch) is considered here. Matrix 60 indicates the volume of traffic, measured in arbitrary units; a unit may represent 100 Mb/s for example. In this example, switch 0 has 40 units destined to switch 1, 160 units destined to switch 2, etc., the total demand being 1200 units. Matrix 62 shows the direct capacity for each switch pair. This is the capacity of each optical channel as determined by its associated electronic switch, the total capacity being 1200 units also in this example. Each entry in matrix 64 is the lesser of the two corresponding entries in matrices 60 and 62. In other words, each entry in matrix 64 closely represents the volume of the directly-routed traffic if an ideal routing algorithm is employed, the total volume being 880 units. An ideal routing algorithm ensures that all traffic that can be transported on a direct one-hop channel is routed as such. Matrix 66 represents the volume of traffic that must use two hops to destination, the total volume being 320 units. As stated above, in this example, the volume of the total traffic is 1200 units, the available capacity is 1200 units, the total internal traffic in the networks amounts to 1520 (880+2× 320) units which is the sum of 880 units of directly-routed traffic plus double the two-hop traffic. The total internal traffic therefore exceeds the available capacity. This suggests that an internal capacity expansion, of at least 25% in this case, is required to accommodate the total demand.

Describing further the construction of the invention, channels are set dedicated to each pair of electronic edge switches, and paths (logical channels) are established prior to connection establishment using the channels. Optical nodes are simple ADM or shufflers of channels. While an optical node and its associated electronic edge switch can be far apart at any length, spanning for example many thousands of miles, it is advantageous to place them within the vicinity of one another as will be explained later.

Figures 4, 5:
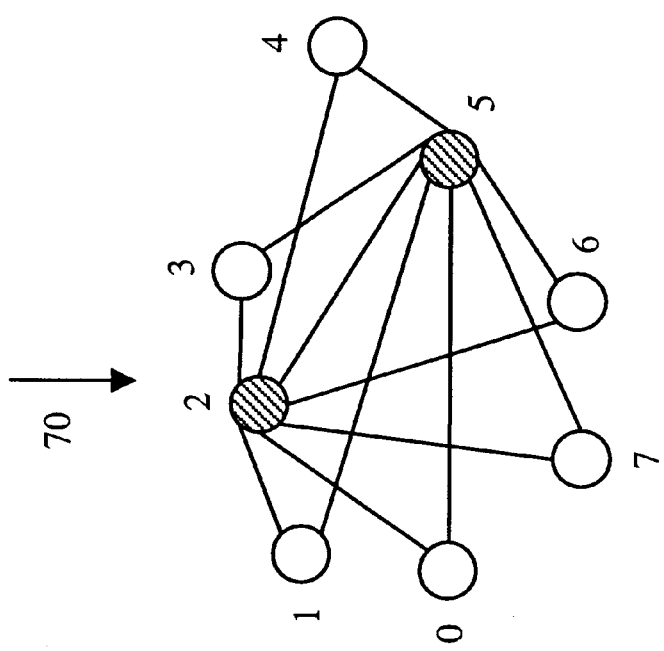
FIG. 4 shows an example of an eight-node network for which a path routing process will be described.
FIG. 5 depicts the path-routing process used to select an end-to-end path in the network of FIG. 4, according to network occupancy as well as link cost indices.

In the following description, in a single access configuration, the term "switching node" is used to refer to an electronic edge switch and its associated optical node. The selection of end-to-end path is determined according to network occupancy as well as link cost indices. The cost index chosen here reflects the end-to-end cost in such a way that the higher the cost, the lower the cost index. A direct path, for example, is often the least expensive and may then be assigned a datum value of 100. If we choose the cost index to be inversely proportional to the cost, then a two-hop path which costs 1.6 times the direct path, for example, would have a cost index of 0.625. The cost indices may be modified to reflect changing network connectivity but are almost static. Other more elaborate formulae may be used to determine the cost indices. Route selection based on the cost indices is illustrated in FIGS. 4 and 5 in which FIG. 4 shows an example of 8 node network 70. In the figure, a path is being established between node 2 and node 5. FIG. 5 depicts the path-routing process in the network of FIG. 4. Each node stores a matrix of cost indices of the two-hop links. For example, referring to FIG. 5, array 80 is a row in the matrix of cost indices stored in node 2. The array shows the cost indices for paths to node 5. The direct path is the datum and is allocated an index of 100. The higher the value of the index the lower is the cost of the path. The cost index for the two-hop path via node 6, for example, is 74 while the cost index for the two-hop path via node 4 is 64. This means that the route via node 4 is more expensive than the route via node 6. Array 82 stores the available free capacity in each path. The free capacity of a two-hop path is defined as the lesser of the free capacities of its two links. Array 84 stores the weighted vacancy for each path from node 2 to node 5. This is the product of the absolute vacancy and the cost indices. The path routing decisions are based on the weighted vacancy. Thus, the underlines in array 84 indicate that the first two choices, after the direct path, would be by way of node I and by way of node 6 respectively.

Let the total number of dual ports of the electronic switch be P. The switch is assumed to be symmetrical with P ingress ports and P egress ports. A pair of ingress port and egress port is hereafter called a dual port. Let us further assume that the ports are identical, with a capacity of R bits per second each, which is also the capacity of a link emanating from a port. Let the number of ports interfacing with the subordinate traffic sources be m. The remaining P−m ports interface with the optical core. A link emanating from a port constitutes a channel. The P−m channels from the electronic switch can connect to a maximum of P−m other electronic switches. Thus, the maximum number of electronic switches that can be fully connected to a given switch is P−m+1. The corresponding total capacity of such a network is then C=m(P−m+1)R. The unconstrained maximum capacity, with no conditions imposed on the ratio n/P is realized when m=(P+1)/2 and is equal to $R(P+1)^2/4$, if P is an odd number. Otherwise, the maximum capacity is realized with m=P/2 or m=(P/2)+1, and is equal to C=RP(P+2)/4.

It may be necessary, however, that the number, n(n=P−m) of ports interfacing with the optical core be larger than the number, m, of ports interfacing with the traffic sources, in order to accommodate the transit traffic. The transit 35 traffic is indicated in FIG. 2 as the traffic from ports 52 to ports 50. It is noted that the volume of the transit traffic would normally be larger than the volume of the intra-switch traffic indicated by the reference sign 44 of FIG. 2. The ratio of the core interface capacity to the source interface capacity depends on the volume of intra-switch traffic, and the imbalance of the spatial traffic distribution. The maximum ratio n:m required with severe imbalance is 2:1. In a typical network, an n:m ratio of about 3:2 should suffice. With this ratio, the number of ports interfacing with the traffic sources would be m=0.4P (rounded to the nearest integer), and the maximum network capacity would be approximately: $C=(0.24P^2+0.4P)R$, which is very close to the unconstrained maximum derived above.

Consider, for example, an electronic switch having 128 dual ports (P=128), and m=52 ports, with 76 dual ports interfacing with the optical core. The maximum network capacity is realized when each switch is connected to each other switch by only a single channel. In this example, the number of electronic switches in the network would be 77 and the maximum capacity available to the traffic sources would be 4004R (52×77×R). With R=10Gb/s, this maximum capacity is then about 40 Tera bits per second. In the extreme-imbalance case where the ratio of n:m is 2:1, 43 ports would interface with the traffic sources and 85 ports interface with the optical core. The maximum number of electronic switches in a fully-connected network would be 86 and the maximum capacity, with R=10Gb/s would be 36.98 Tb/s.

As mentioned above, the highest capacity is attained when n=m. A configuration with m=n can not be used with spatial traffic imbalance. However, it offers an interesting reference point. With P=128, the highest capacity is C=RP(P+2)/4. With R=10Gb/s, this capacity is 41.6 Tb/s.

It is seen from the above example that the capacity limit does not change significantly when the ratio n:m changes within practical bounds. The main consequence of increasing the n:m ratio is the increase in the number of electronic channels required to realize the highest capacity fully-connected network. The ratio n:m is a function of traffic imbalance as mentioned earlier.

Figure 6:
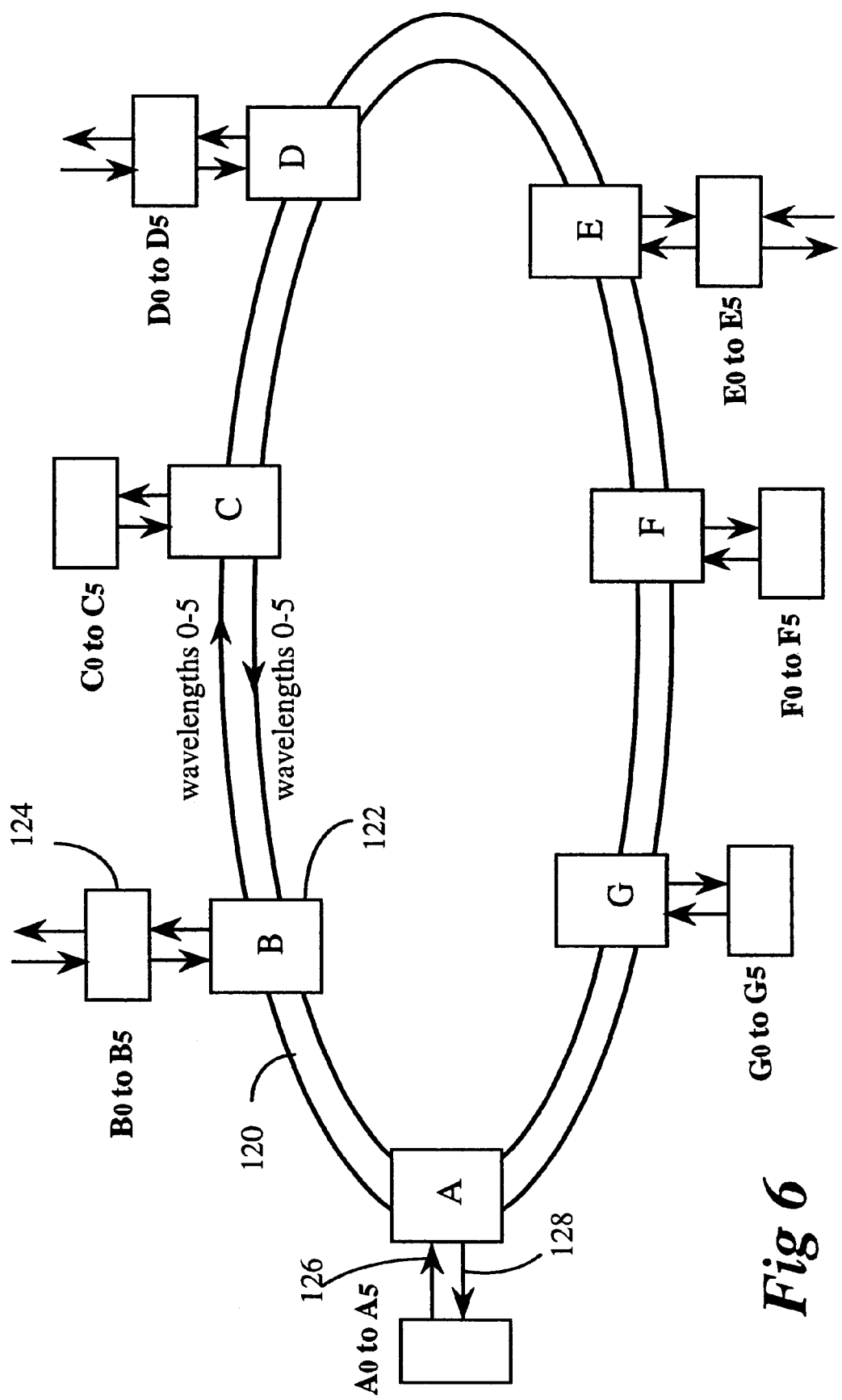
FIG. 6 shows schematically a simple implementation of the network of FIG. 1, using a ring structure, according to one embodiment.

FIG. 6 shows schematically a simple implementation of the network of FIG. 1, using a ring structure, according to one embodiment. A dual ring 120, with more than one optical channel in each direction, can connect several optical nodes 122 in a fully meshed configuration having at least one dedicated channel between any node pair. Each optical node 122 is connected to an electronic edge switch 124. A dual ring comprises two rings of opposite directions. Each node on a dual ring connects to both rings. A dual ring is used to avoid looping around a large segment of the ring. For example, in FIG. 6, optical node A (which is a simple ADM or shuffler A) would have to use five intermediate optical nodes to reach optical node G if the ring was unidirectional in the clockwise direction. In the dual ring shown, optical node A reaches B, C, and D in the clockwise direction and G, F, and E in the counterclockwise direction.

Each of the optical circuits 126 and 128 between an electronic edge switch and its associated optical node comprises multiple channels. Therefore, an electronic switch with n ports interfacing the optical core may multiplex the signals from the ports onto WDM fibers in bundles of k wavelengths per fiber. The value of k is technology dependent. If, for example n=72, and using fiber links supporting eight wavelengths each (k=8), then nine WDM fiber links are used to interconnect with the core. The optical channels are allocated in such a way as to grant each electronic edge switch at least one optical channel to one of the optical nodes (optical ADMs) associated with each other electronic switch. In FIG. 6, WDM fibers are shown in the ring with six wavelengths, #0 to #5.

Figure 7:
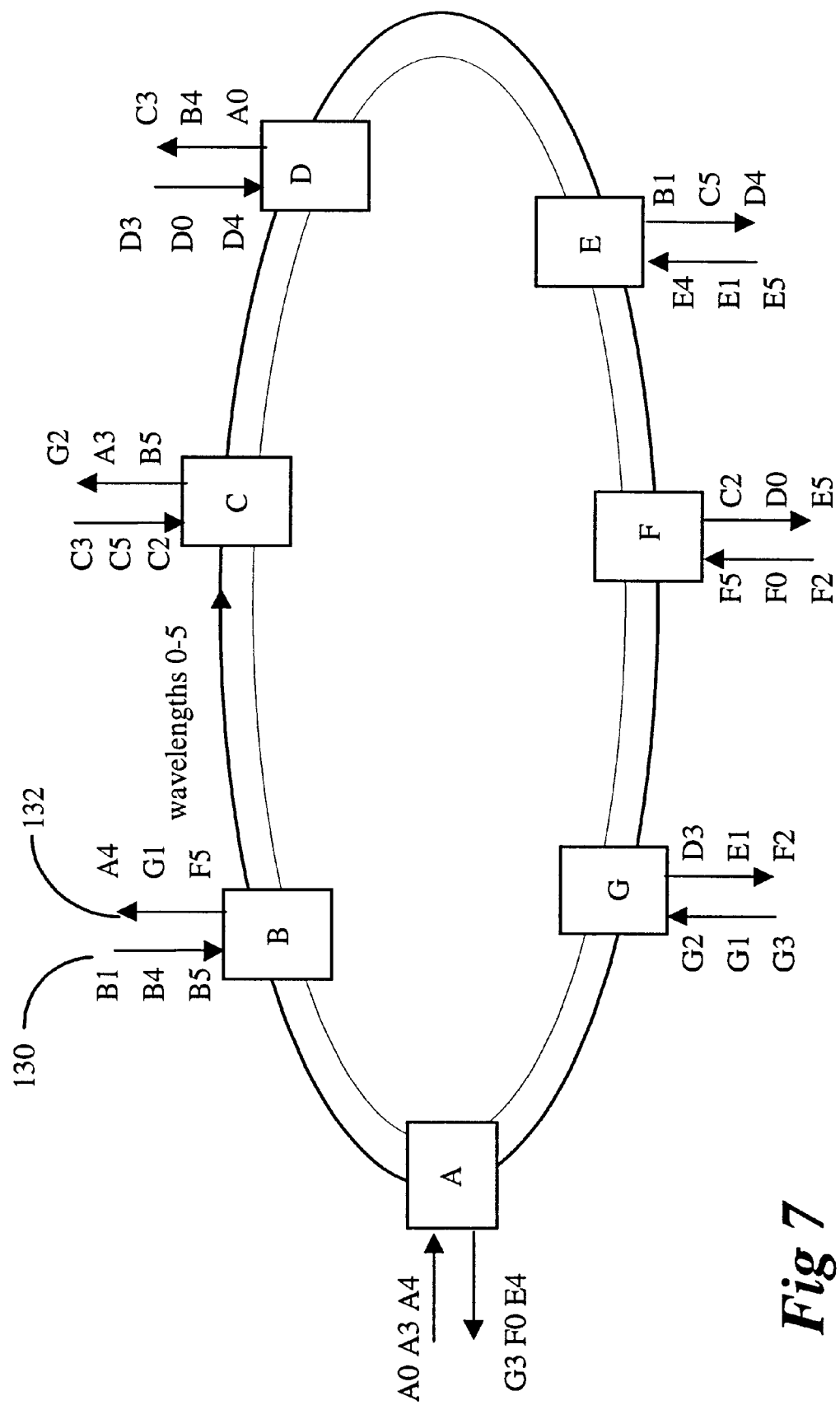
FIG. 7 shows one possible channel (wavelength) allocation among the optical nodes in the clockwise direction.
Figure 8:
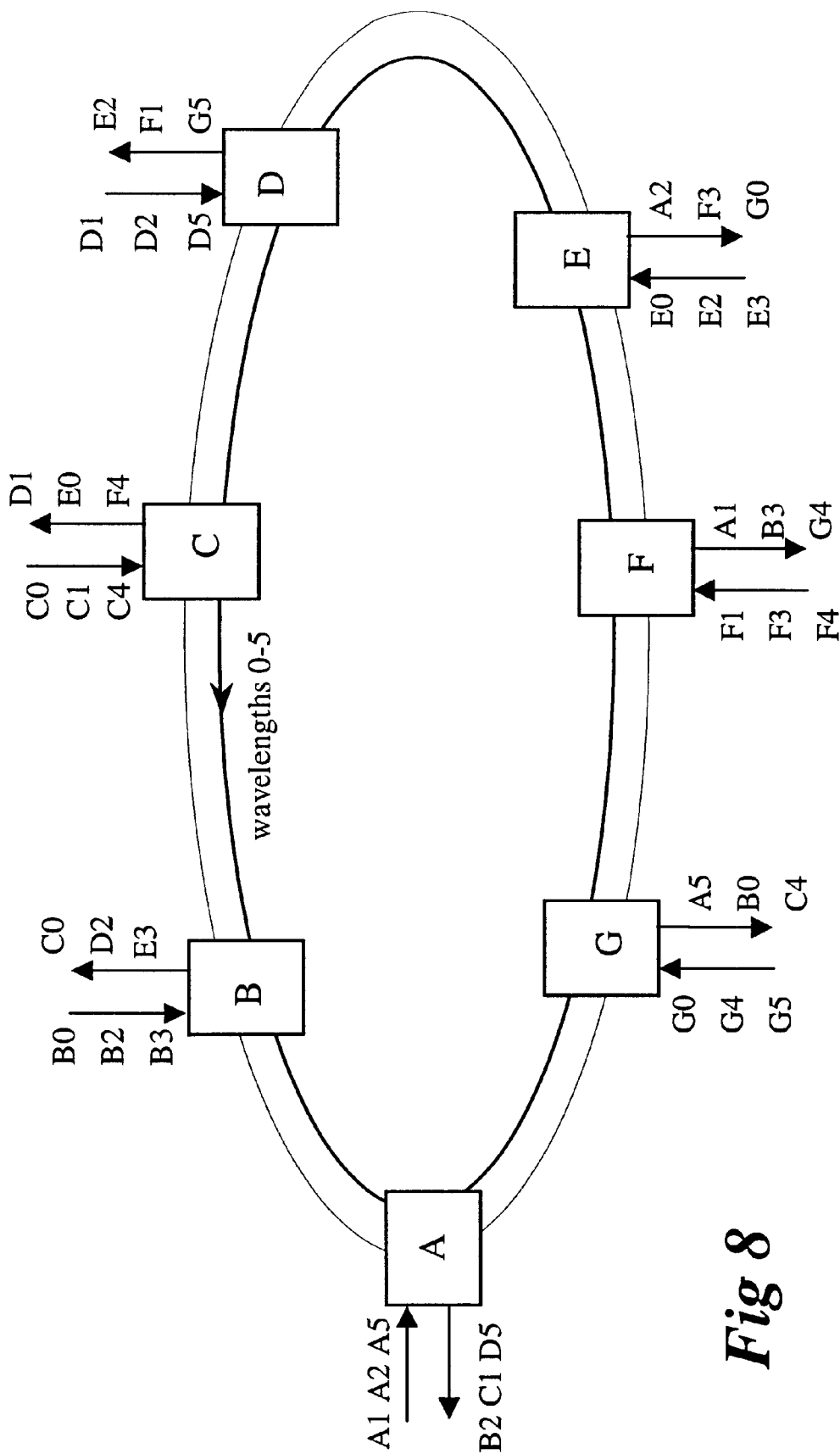
FIG. 8 is a similar allocation to that in FIG. 7 but in the counter clockwise direction.
Figure 9:
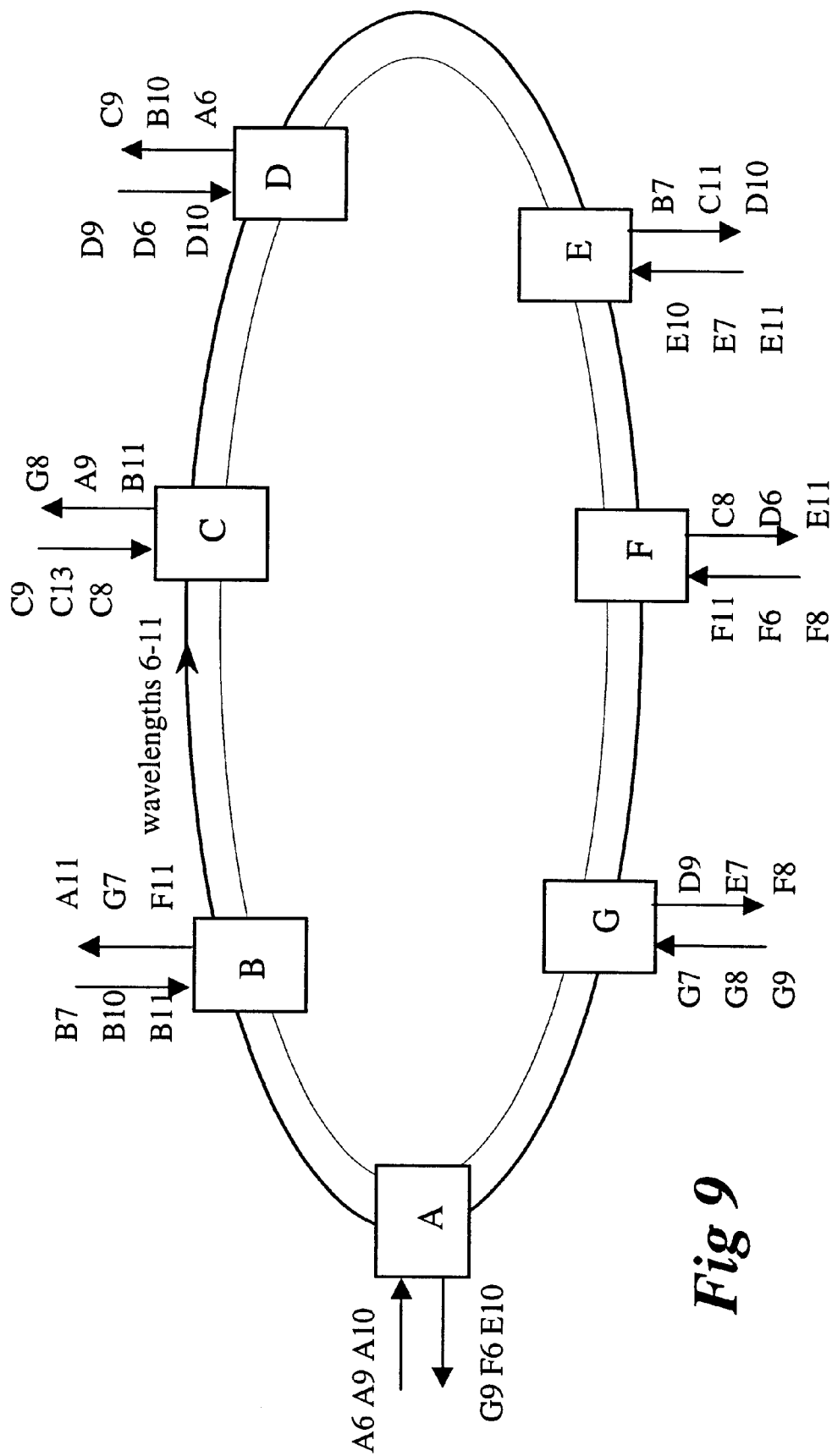
FIG. 9 is a wavelength allocation in the case of multiples of six wavelengths incoming to each optical node in the clockwise direction.
Figure 10:
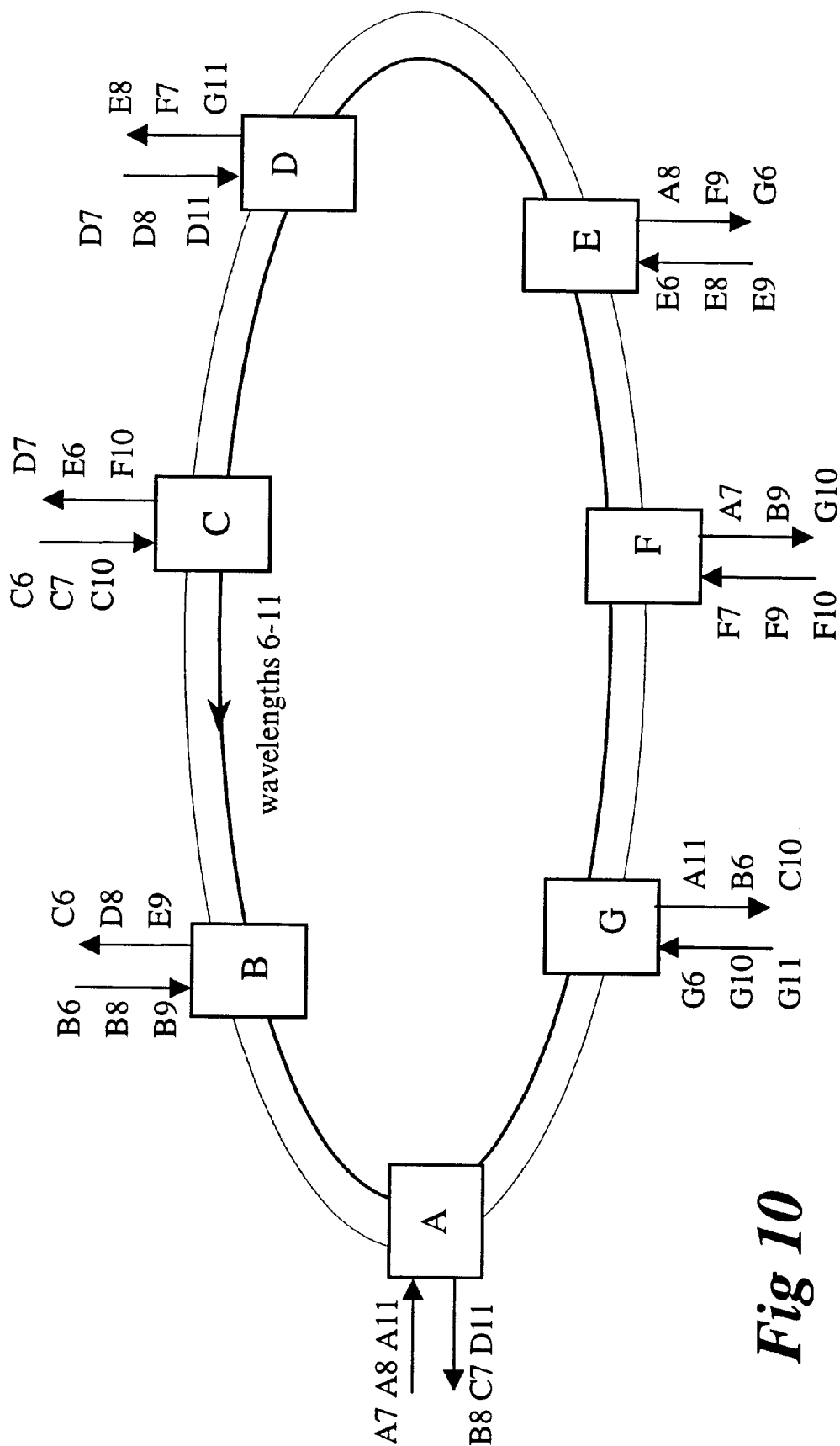
FIG. 10 is a similar allocation to that in FIG. 9 but in the counter clockwise direction.

For example, for a network with seven nodes on a ring in one direction as shown in FIG. 6, only six channels (wavelengths) are required in each ring and the maximum hop count for any channels is three. Each optical node receives six wavelengths, to be delivered to the other six optical nodes, and drops six wavelengths, one wavelength from each of the other optical nodes in the same ring to be delivered to the associated electronic switch. One possible channel (wavelength) allocation among the optical nodes in clockwise direction is shown in FIG. 7. A similar allocation in the counter clockwise direction is illustrated in FIG. 8. In FIGS. 7 and 8, channels #0, #1, etc., originating at node A are designated as A0, A1, etc. Thus channels #0 to #5 are added at node A and are appropriately shuffled to each of the six destination optical nodes. In particular, the shuffle pattern is preset so that channels #0, #3 and #4 are added on the clockwise ring to be dropped at nodes D, C, and B, respectively. The remaining channels are added on the counter-clockwise ring to reach proper destination nodes with minimum hops. As shown in the figure, only six channels, #0 to #5 are sufficient in each of the two directions to provide a fully meshed configuration with the maximum of two intermediate (pass-through) optical nodes. Each of the incoming and outgoing optical circuits 130 and 132 carries at least six wavelengths (channels). Wavelength allocation in the case of multiples of six wavelengths incoming to each optical shuffler follows the same pattern for each group of six wavelengths. As shown in FIGS. 9 and 10, the allocation for incoming wavelengths #6 to #11 bears a one-to-one correspondence to the allocation for wavelengths #0 to #5.

Figure 11:
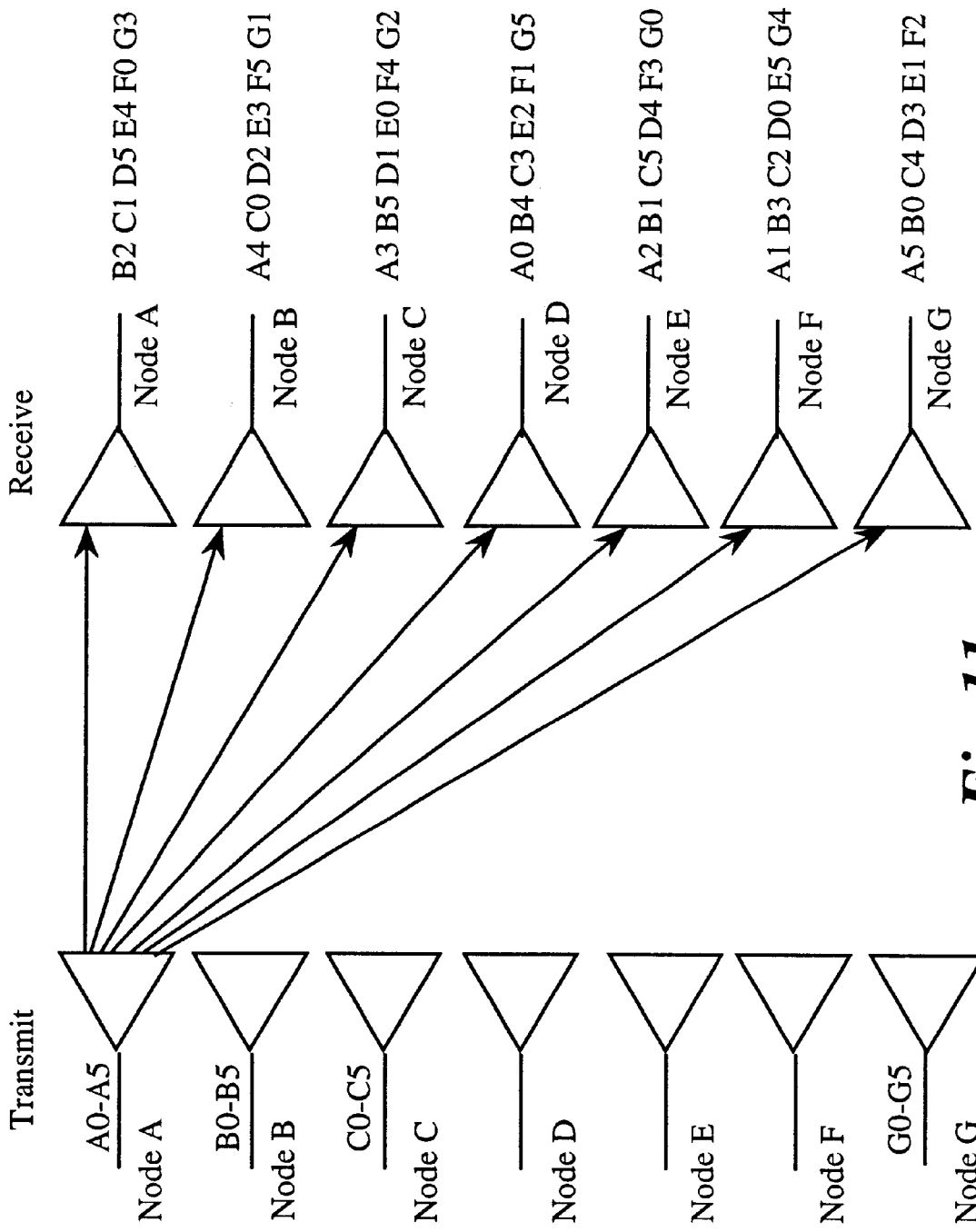
FIG. 11 is a functionally equivalent illustration of the network shown in FIGS. 7 and 8.
Figure 12:
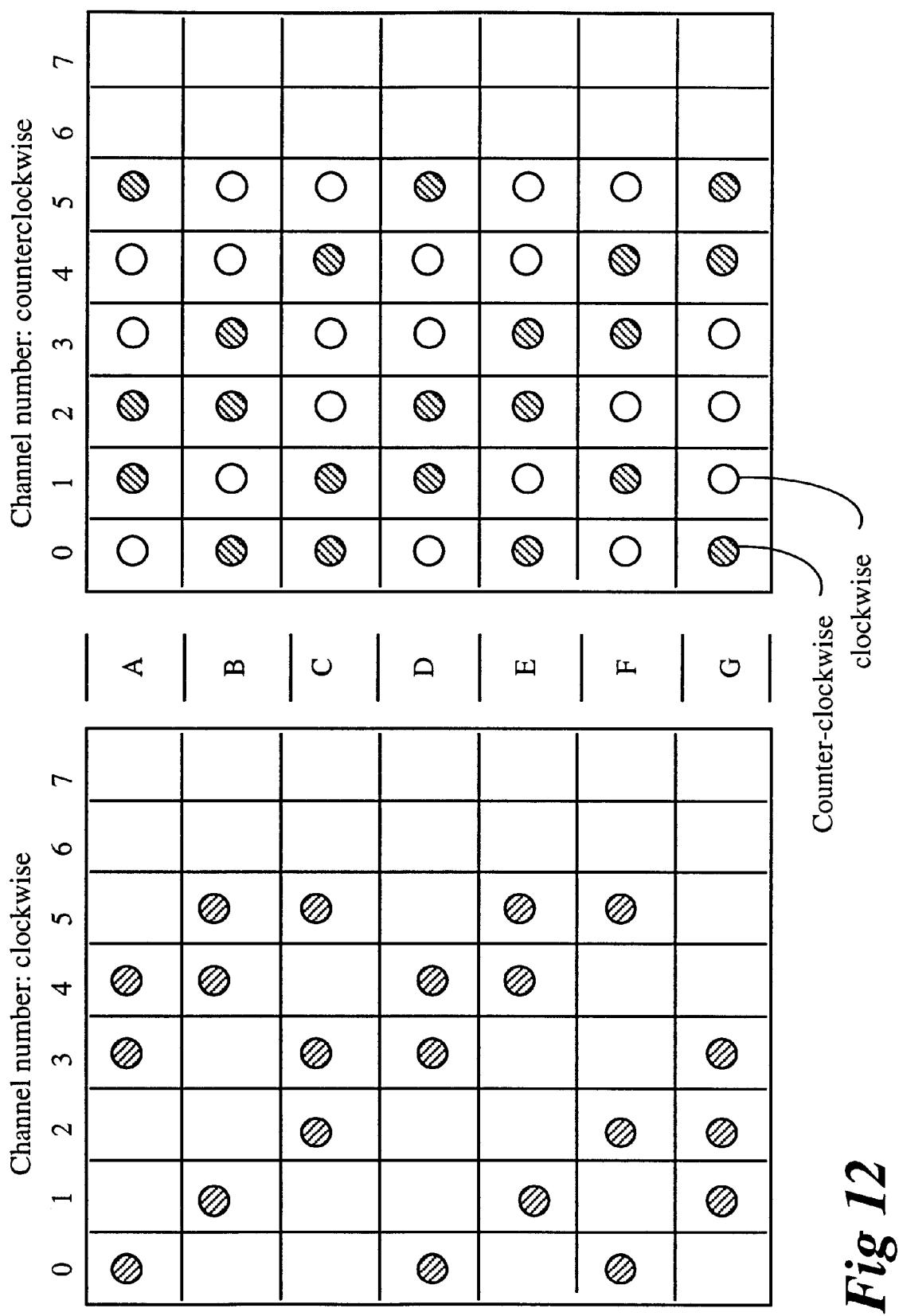
FIG. 12 depicts the allocations for wavelengths #0 to #5 in a tabular form.

Functionally, FIGS. 7 and 8 can be redrawn as in FIG. 11 in which the channels are shuffled, or added and dropped, in a prefixed pattern among the nodes. In the configuration, six channels are added at each node, of which one channel is dropped at each of the other nodes. The shuffle pattern may be dynamically variable. FIG. 12 depicts, in a tabular form, the allocations for wavelengths #0 to #5 in the ring of seven optical shufflers, in the clockwise direction as well as in the counter-clockwise direction. Such a tabular form may be used as a tool for devising the wavelength allocations.

The wavelength allocations shown are devised so as to satisfy the condition that no duplicate wavelengths should appear in any fiber section (between successive optical shufflers) or in any outgoing fiber (towards the electronic switch, directly or through a global shuffler). Channel allocations other than those shown in FIGS. 7–10 may be possible.

Figure 13:
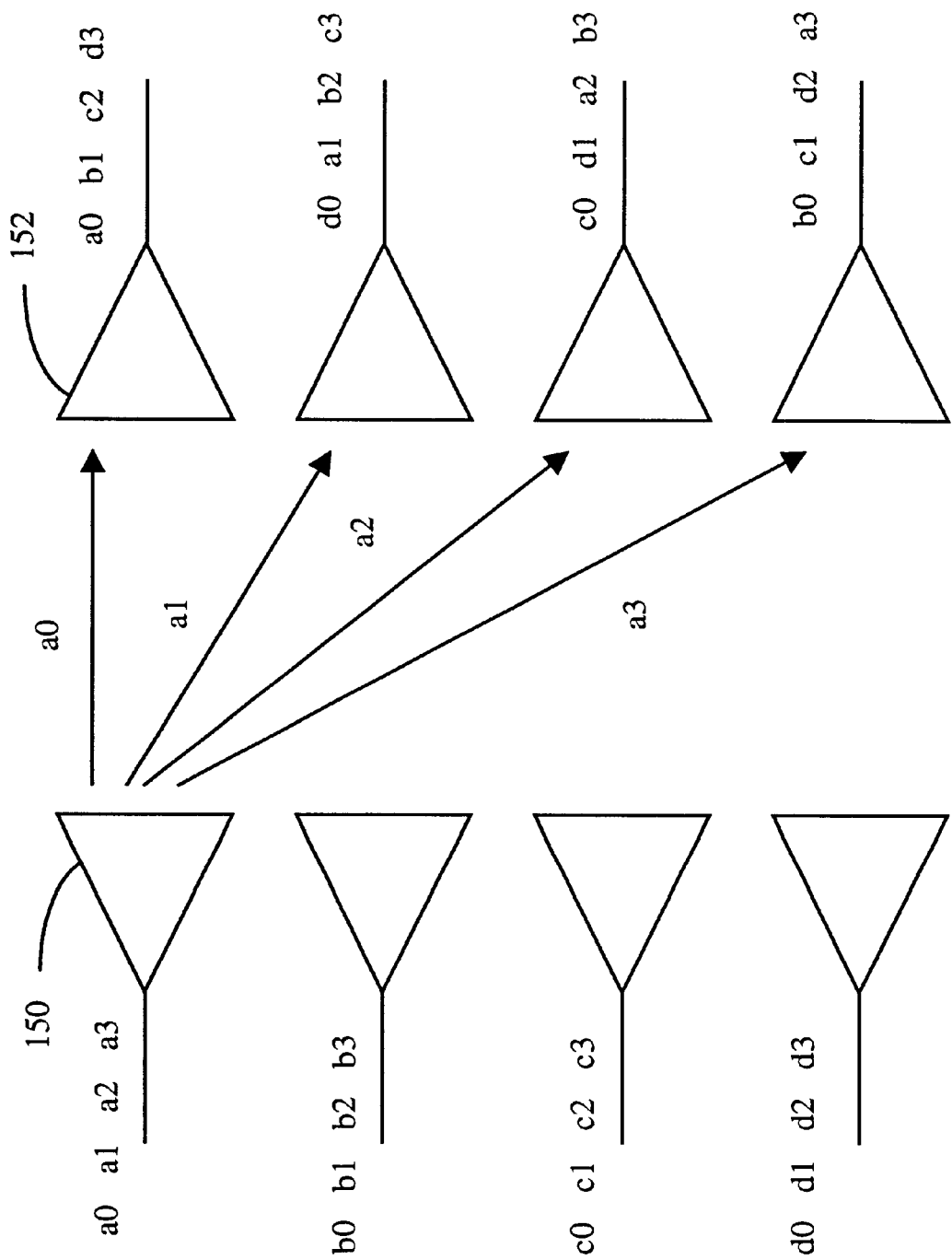
FIG. 13 shows an example of a classical optical shuffler.
Figure 14:
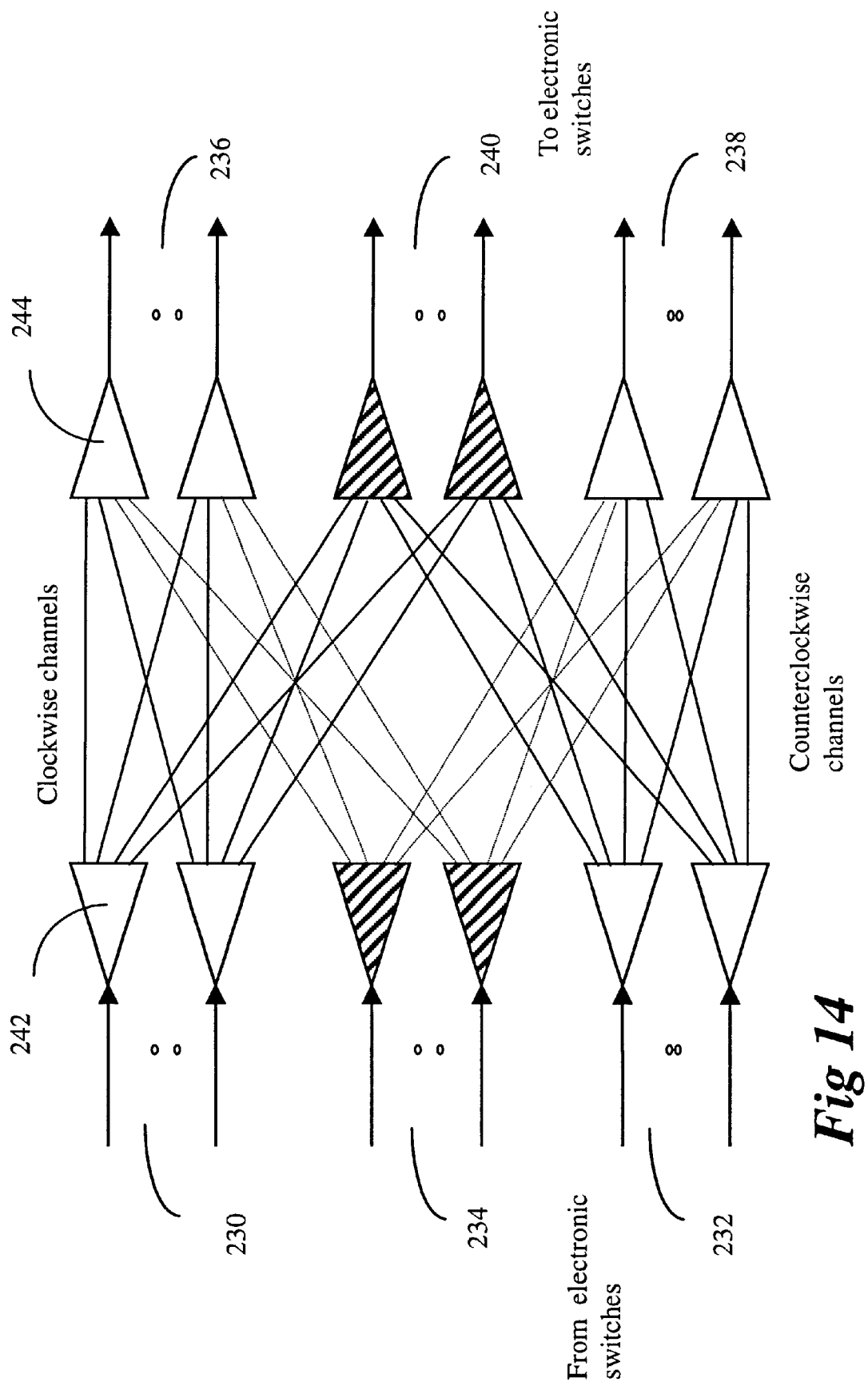
FIG. 14 shows a more generalized form of the optical shuffler of FIG. 13.

FIG. 13 shows an example of a classical optical shuffler. In this example, there are four incoming fiber links a, b, c and d, each supporting four wavelengths a0–a3, b0–b3, c0–c3 and d0–d3. A wavelength represents a channel. Four wavelength demultiplexers 150 are used and the individual channels are shuffled. Four multiplexers 152 multiplex received wavelengths onto each of four outgoing fibers. The pattern of shuffle is such that each outgoing fiber carries four wavelengths, one from each of the incoming fibers. In the case of the dual WDM ring, such as the ring shown in FIGS. 6–10, a shuffler shown in FIG. 14 is used in which the inputs to the shuffler are the clockwise fiber link 230, the counter-clockwise fiber link 232, and the incoming fiber 234 from the electronic switches, which may be directly connected or connected through a global shuffler. The shuffled output is distributed to the clockwise fiber link 236, the counterclockwise fiber link 238, and the fiber link 240 to the electronic switches. FIG. 14 shows the interconnection of the demultiplexers 242 and multiplexers 244. The global shufflers will be described later. In this example, each fiber carries the minimum of six wavelengths. As mentioned earlier, the wavelength allocations shown in FIGS. 7 and 10 are devised so as to satisfy the condition that no duplicate wavelengths should appear in any fiber section (between successive optical shufflers) or in any outgoing fiber (towards the electronic switch, directly or through a global shuffler).

An edge switch receives traffic from local sources as well as from the optical core and it decides to transmit it to the local destination or to the optical core. At each ingress port in each node, external traffic is buffered in separate queues according to destinations and other criteria.

Control signals are sent to establish a path between a source node and a destination node. As mentioned earlier, more than one path can be assigned to a node pair at one time. A distributed control or central control scheme is possible for path assignment, setting up and tearing down. The two end nodes agree on the rate allocations of each traffic path within the channel. At each node, a rate control mechanism for each channel regulates the rate allocation for the aggregate traffic directed to the same destination.

Feature rich edge switches control the characteristics of the connection including the QOS and this avoids the complexity of having to deal with it at intermediate nodes. When end-to-end bandwidth demand can not be accommodated for all node-pairs, distinction based on some class or other criteria is required for acceptance of new capacity demands. The QOS may have several interpretations. The network architecture of the invention allows the QOS to be defined on a node-pair basis.

The modification of the end-to-end capacities of established paths would normally take place at a rate that is substantially slower than the rate of transaction processing at the end nodes. For example, the capacity of a given path may be modified every 10 milliseconds while the sending end node of the path may be transmitting packets at the rate of 10000 packets per millisecond. The capacity of a path may be modified in response to admission control requirements or it may be modified according to the level of occupancy of the buffers at the originating node.

A very-high capacity container switch is needed to interconnect the channels in a WDM multi-fiber ring. Large container switches, with capacities ranging from 40 Gb/s to 20 Tb/s are realizable using a rotator-based core architecture. Several alternate realizations are possible.

Figure 15:
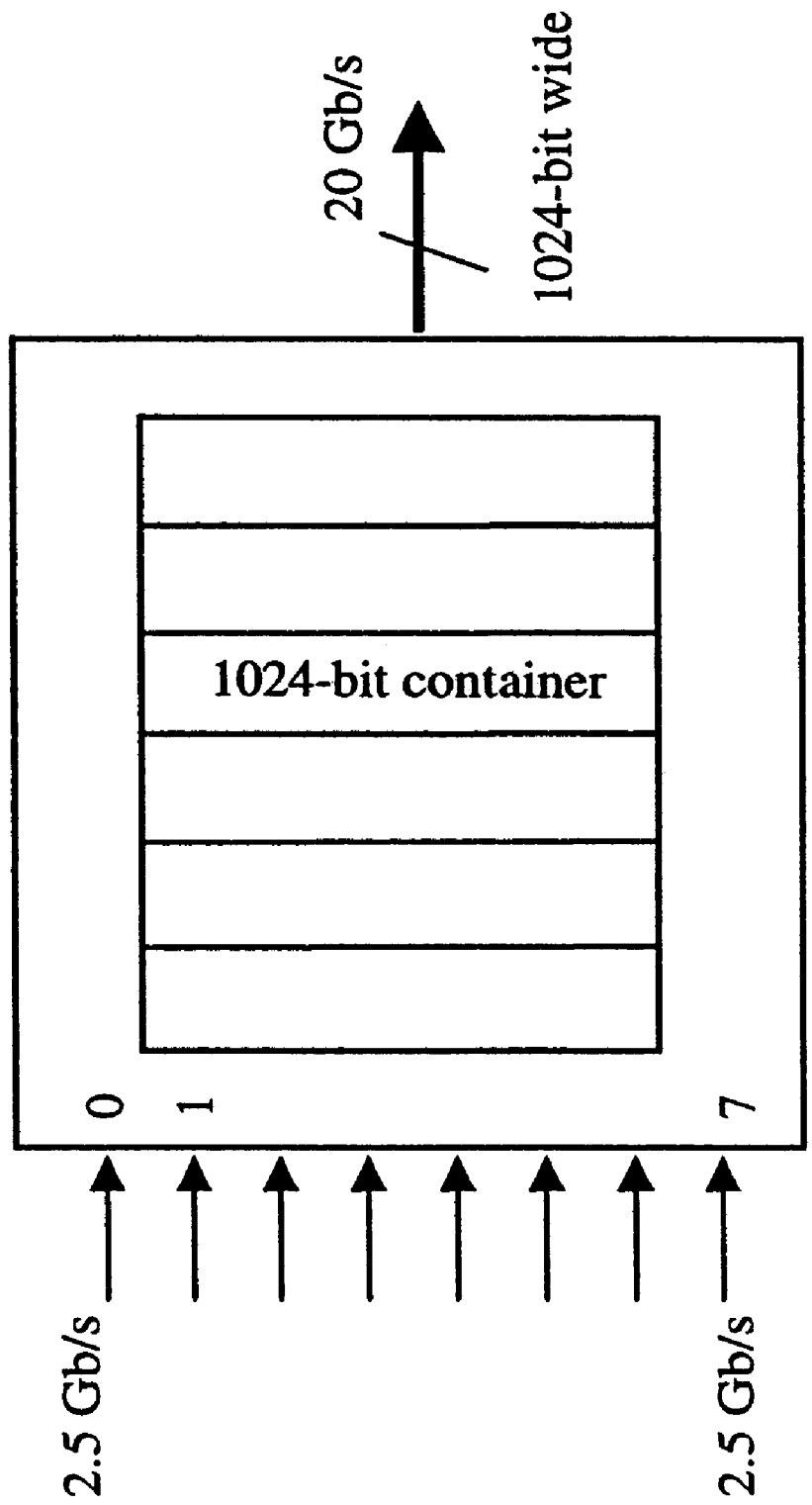
FIG. 15 is a schematic illustration of a common-memory module.
Figure 16:
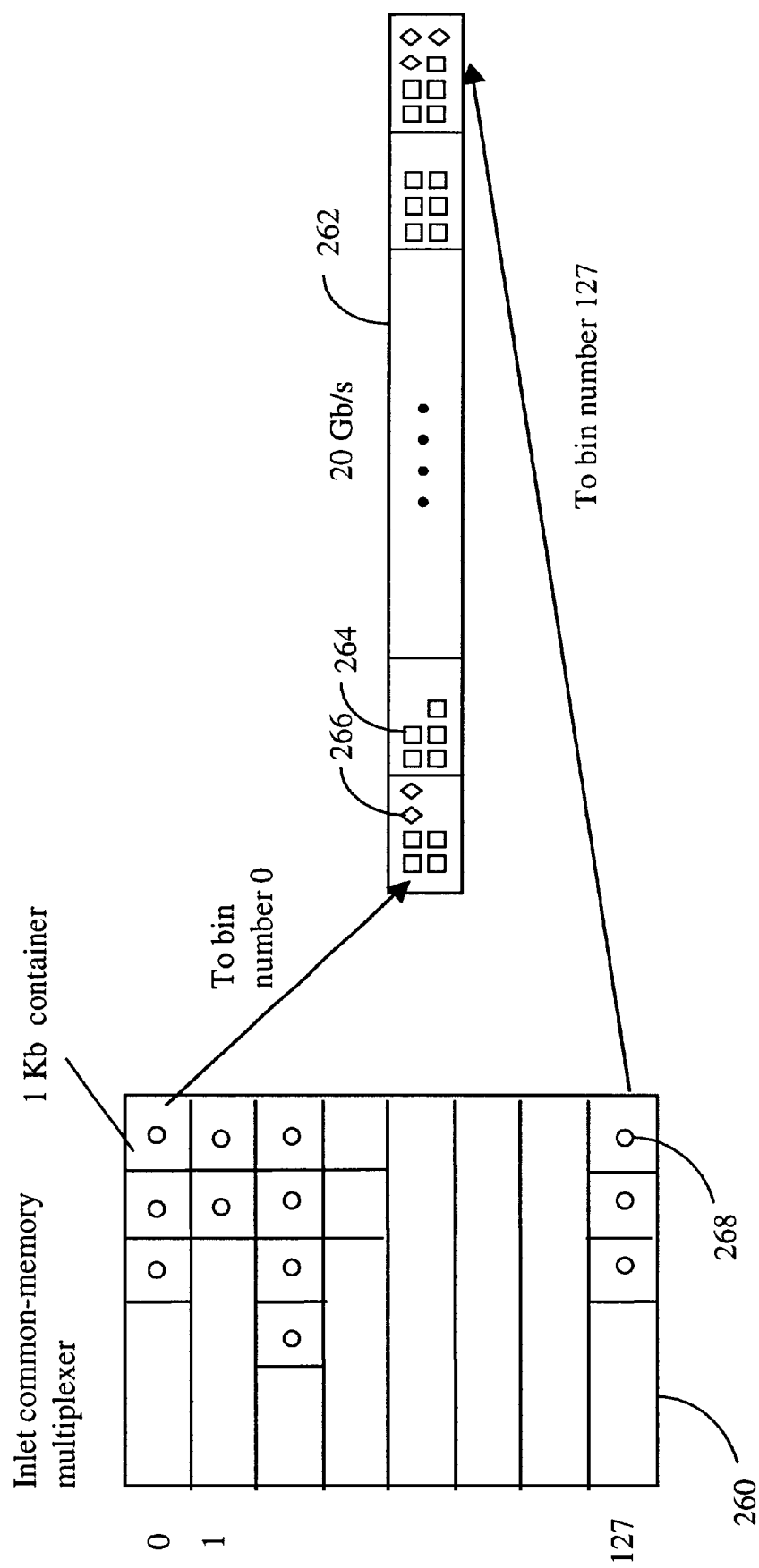
FIG. 16 is schematic illustration of operation of containers sorted according to destination module and transferred to middle buffers accordingly.
Figure 17:
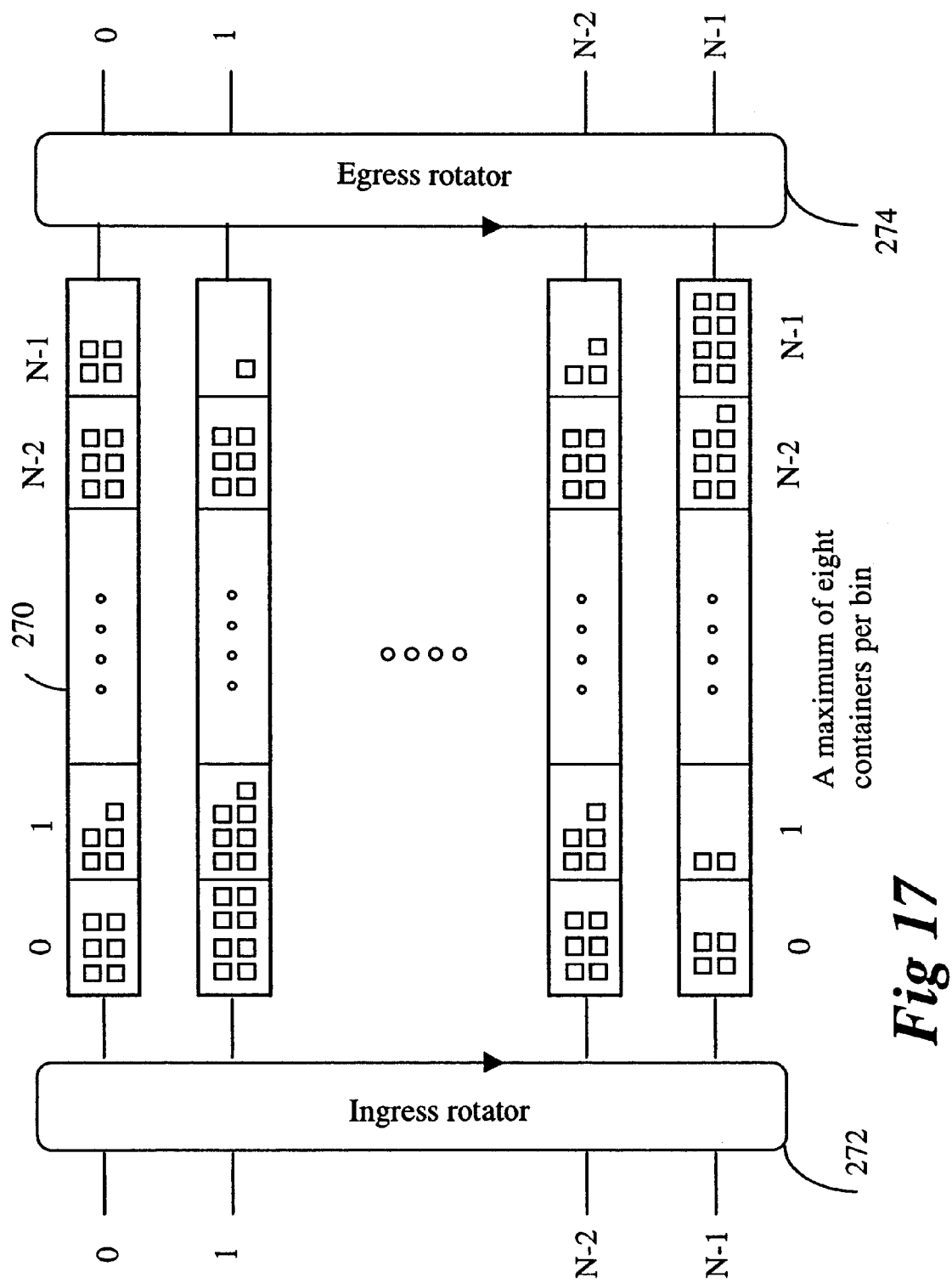
FIG. 17 is a schematic illustration of a core of a high-capacity container switch.

A rotator-based electronic switch comprises m inlet modules, m middle buffers, and m outlet modules. In a multi-wavelength application, each inlet module comprises a wavelength demultiplexer and a common-memory switch. A relatively-high capacity is attainable with a large container width, of 1024 bits for example. The common-memory inlet multiplexer is depicted in FIG. 15. Such a rotator-based electronic switch is described in detail in U. S. Pat. No. 5,745,486, Apr. 28, 1998, Beshai et al, which has one of the present inventors as a coinventor. In FIG. 16, at each inlet port 260, the containers are sorted according to their outlet ports to facilitate their assignment to the middle buffers 262. The middle buffer is partitioned into bins, each assigned to each output port. The figure also shows data 264 waiting for transfer to outlet, those 266 that have been transferred to the middle buffer, and those 268 that are to be transferred or being transferred to the middle buffer. FIG. 17 shows middle buffers 270, an inlet rotator 272 and an outlet rotator 274. Through the inlet rotator, the inlet modules cyclically access the middle buffers. Each inlet module transfers a number of containers, which may be addressed to different outlet ports, during its access time. A guard time may be needed for transition from one middle buffer to the next. Multi-container transfer per access interval is desirable in order to reduce the relative overhead of the guard-time between transitions from one middle buffer to the next. In FIG. 16, each middle buffer is 1024-bit wide. With 25 nsec access time, the transfer capacity per middle buffer is about 40 Gb/s.

Using a container of 1024 bits and 25 nsec memories, for example, it is possible to construct a 5.12 Tb/s rotator-based switch (m=128) with a maximum systematic delay of the order of a few microseconds. The systematic inlet-outlet delay of a rotator-based switch is described in U.S. Pat. No. 5,745,486 (Beshai et al). The switch serves only rate-regulated service with the rate per connection being an arbitrary value. The containers are well spaced in time, resulting in a very-high utilization of the order of 0.98 of the port capacity.

In the switch of FIG. 17, a switch scheduler periodically receives the required inlet-outlet rates, as well as information on the number of waiting containers per inlet-outlet pair, from the inlet modules. It uses this data to determine the access schedule to the middle buffers, for each inlet module.

Figure 18:
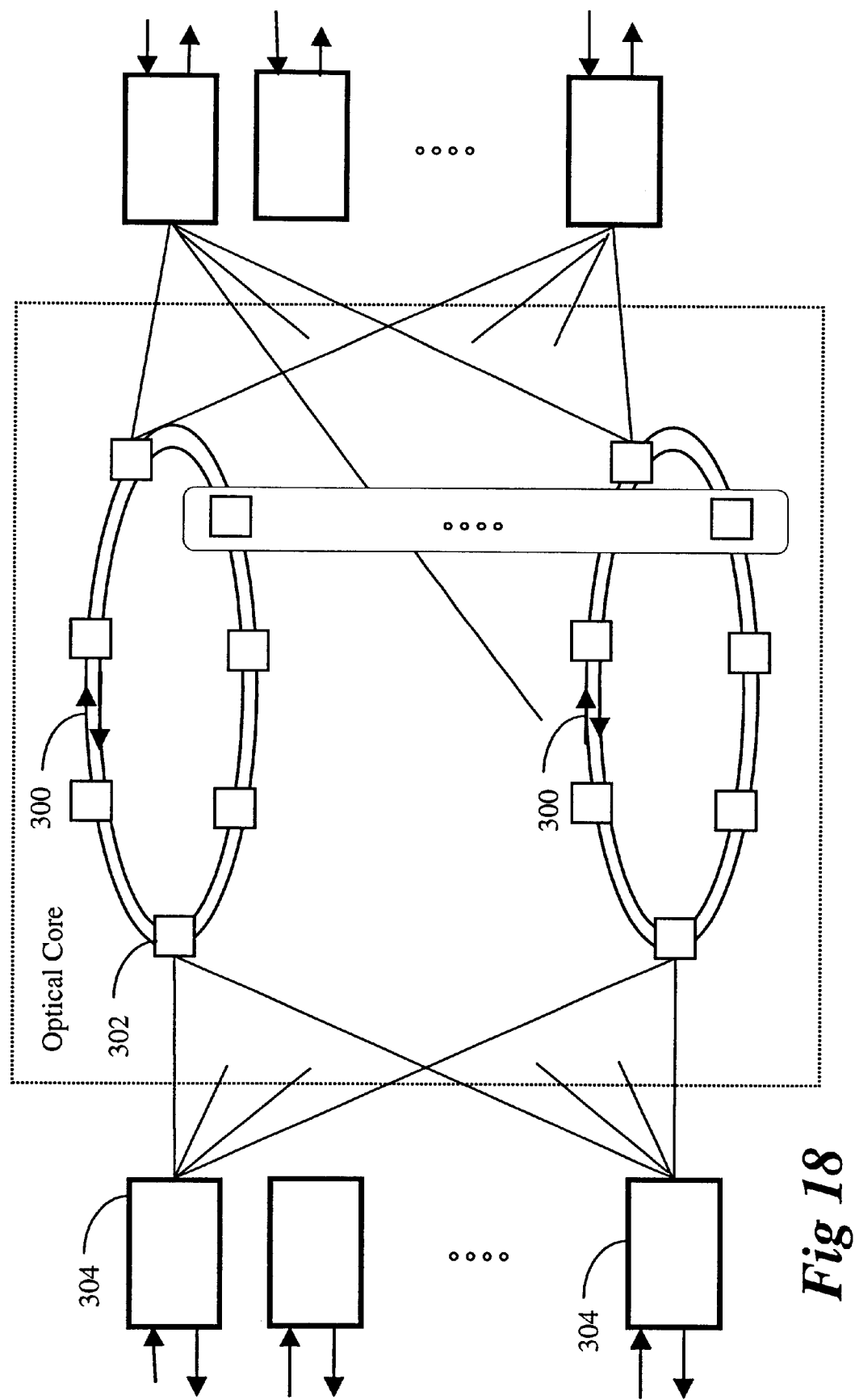
FIG. 18 illustrates a multiple ring configuration according to a further embodiment in which two or more rings are operated in parallel and each electronic switch can access each of the rings.

As mentioned earlier, the number of optical nodes per ring should be relatively small, because the efficiency of the ring drops as the number of the optical nodes increases. In order to increase the overall capacity, however, similarly configured multiple rings may be operated in parallel, and each electronic switch may access each of the rings. FIG. 18 shows the case of an electronic switch interfacing an optical core. The optical core comprises multiple sets of dual rings 300. Each set of dual rings has multiple optical-node groups 302. Full connectivity is realized by multiple electronic switches 304 connecting one or more optical nodes of each group of dual rings.

Referring to FIG. 6, the dual ring shown therein uses two WDM fiber links and the two links carry channels with identically-defined wavelengths to interconnect the seven optical nodes. Six wavelengths are added and six wavelengths are dropped at each optical node. For brevity, the dual ring is hereafter referenced as a ring and the set of wavelength added or dropped at each optical node is referenced as a channel set. A channel set is the minimum number of channels needed in each direction in the ring to ensure full connectivity within the ring. A fully-connected multi-ring network is arranged as a number S of ring sets, each ring set containing D rings. With each ring having T optical nodes (ADMs for example), the total number of rings in the network is S×D and the total number of optical nodes is then S×D×T. Each switch is paired with an optical-node group of D optical nodes belonging to D different rings of the same ring set. In a uniform structure, D=S. The electronic switches are divided into T switch sets, with each switch set containing S switches. The selection of the members of each switch set is based on topological and traffic-load considerations and is not discussed in this disclosure. Each electronic switch interfaces with the network core through S outgoing links or virtual links and S incoming links or virtual links. A link carries a number of channels and a virtual link constitutes a subset of the channels of a link. Each electronic switch X is associated with an optical-node group in a ring set X. The network delivers data to an electronic switch exclusively through its associated ring set. Each electronic switch sends its data to the network through at least S links or virtual links. Each electronic switch has at least one outgoing link or virtual link to a selected optical node in each ring set, with said link or virtual link carrying a channel set matching the wavelength set used in the accessed optical node. In addition to the matching wavelength set, the link or virtual link emanating from a given electronic switch X belonging to a switch set Y carries an extra channel to be routed to the other switches of switch set Y. Thus, with T=7, as is the case of the example of FIG. 6, the link or virtual link from switch X to an optical node belonging to the ring set associated with switch X carries a channel set of six wavelengths while the link or virtual link from switch X to optical nodes belonging to ring sets other than ring set X carries a set of seven wavelengths. Thus, the total number of channels outgoing from an electronic switch to the optical core is S×T−1.

Figure 21:
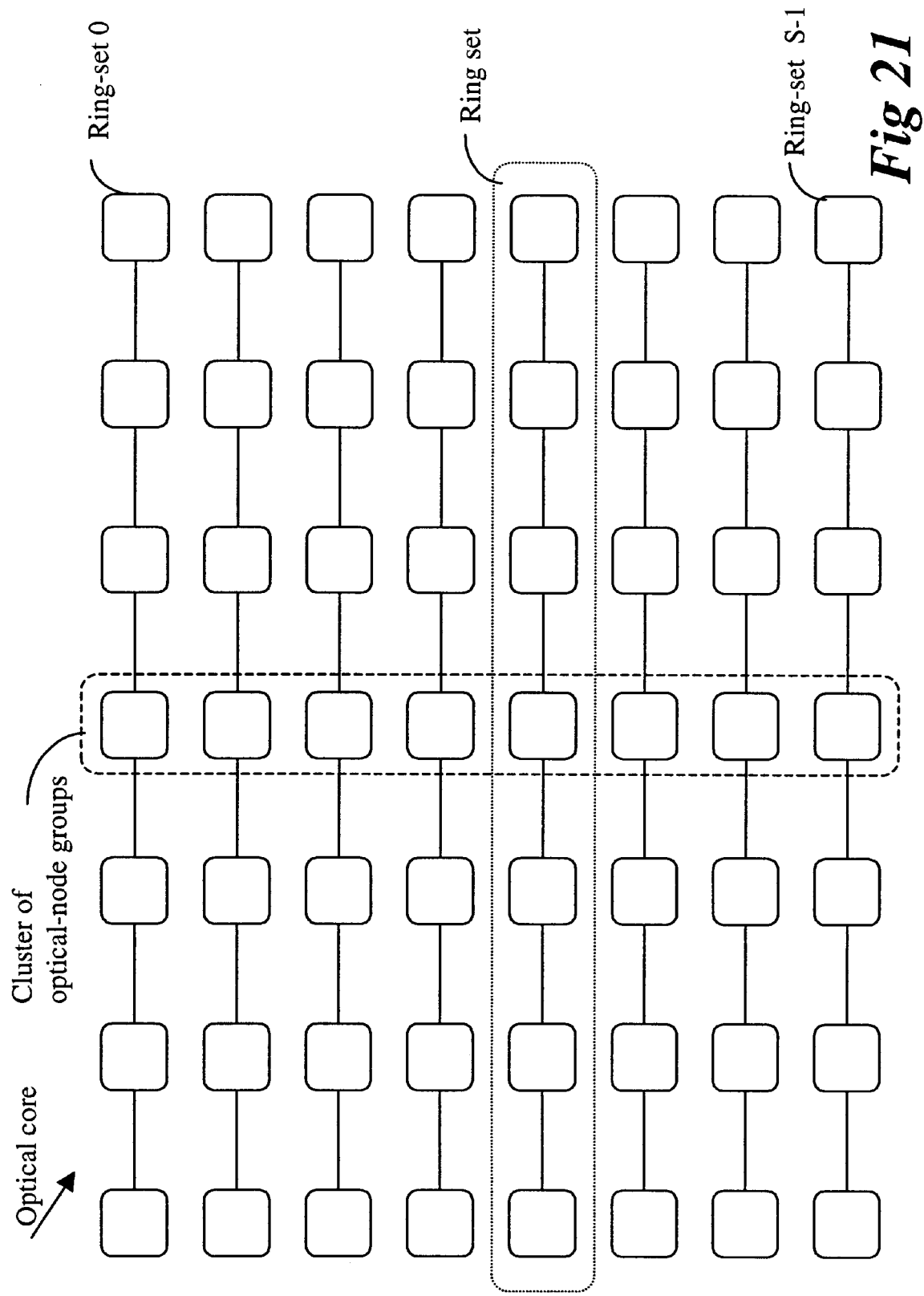
FIG. 21 shows one embodiment in which an optical core of a network comprises eight ring sets.

FIG. 19 depicts one embodiment of the multi-ring architecture described thus far in which a ring set comprises eight rings (S=8), with each ring connecting seven optical nodes (T=7). There are seven optical-node groups, each of which may be associated with an electronic switch. FIG. 20 hides the details of FIG. 19 and shows only the seven optical-node groups in the ring set. There is a direct link or virtual link from each optical node in an optical-node group to the electronic switch associated with the optical-node group. One of the links or virtual links carries T−1 channels and each of the remaining S−1 links or virtual links carries T channels. FIG. 21 shows the optical core of a network of eight ring sets (S=8) and depicts a cluster of S optical-node groups. It may be efficient to connect a cluster of S optical-node groups with their S associated switches using a global channel shuffler rather than using individual fibers. This is particularly the case with dense WDM fiber links.

Figure 22:
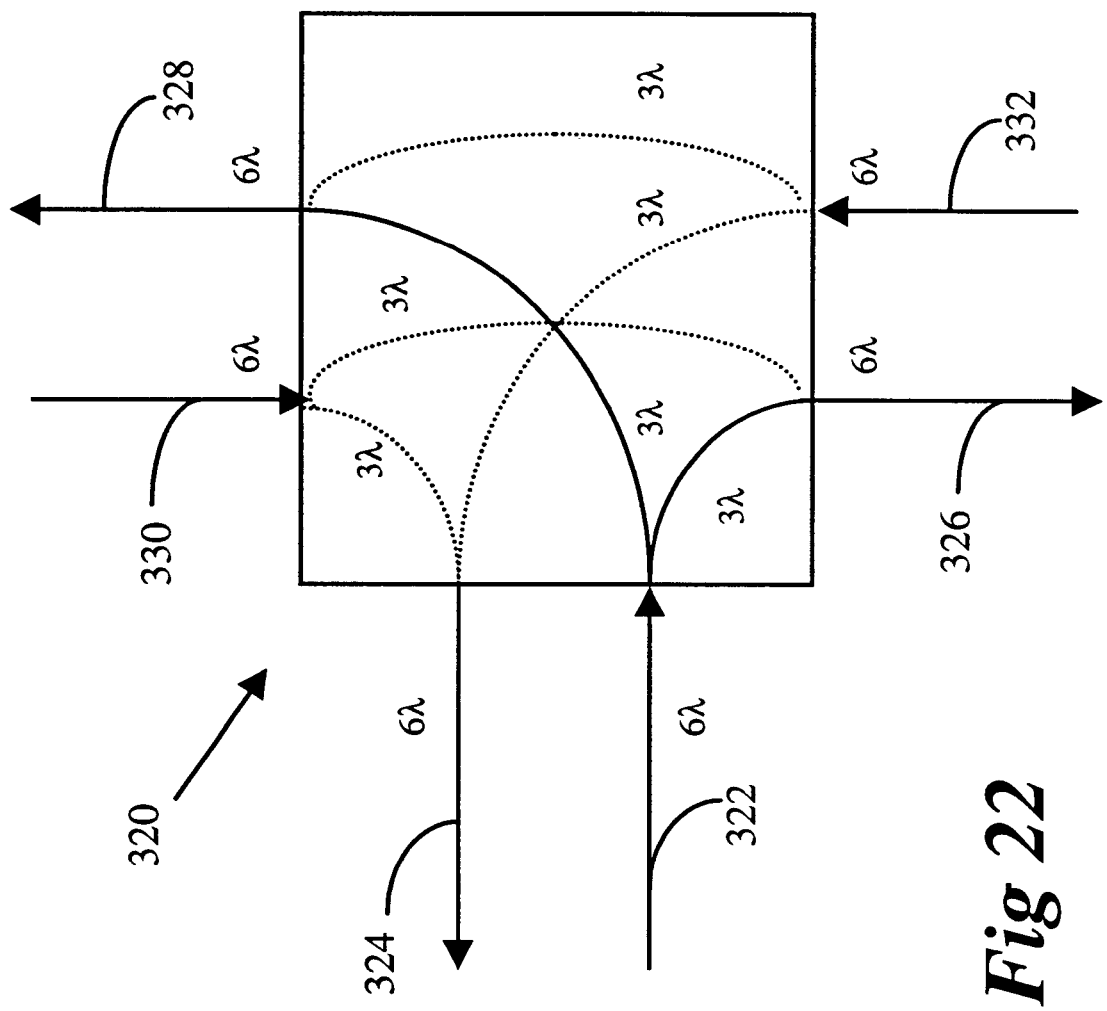
FIG. 22 illustrates the channel connectivity within an optical node in a configuration such as that shown in FIG. 6.

FIG. 22 illustrates the channel connectivity within an optical node 320 where the fiber link 322 incoming from the associated electronic switch carries six channels, and the fiber link 324 from the optical node 320 to the associated electronic switch carries six channels. Of the six incoming channels from the electronic switch, three are inserted in the clockwise half 326 of the dual ring, and the other three are inserted in the counterclockwise half 328. Of the six channels incoming from the clockwise ring 330, three are dropped to the fiber link 324 bound to the associated electronic switch, and the other three remain in the ring, proceeding to the next optical node. The channels incoming from the counterclockwise half 332 of the ring are treated likewise. It is noted that wavelength conversion is not required when the wavelengths are assigned properly.

Figure 23:
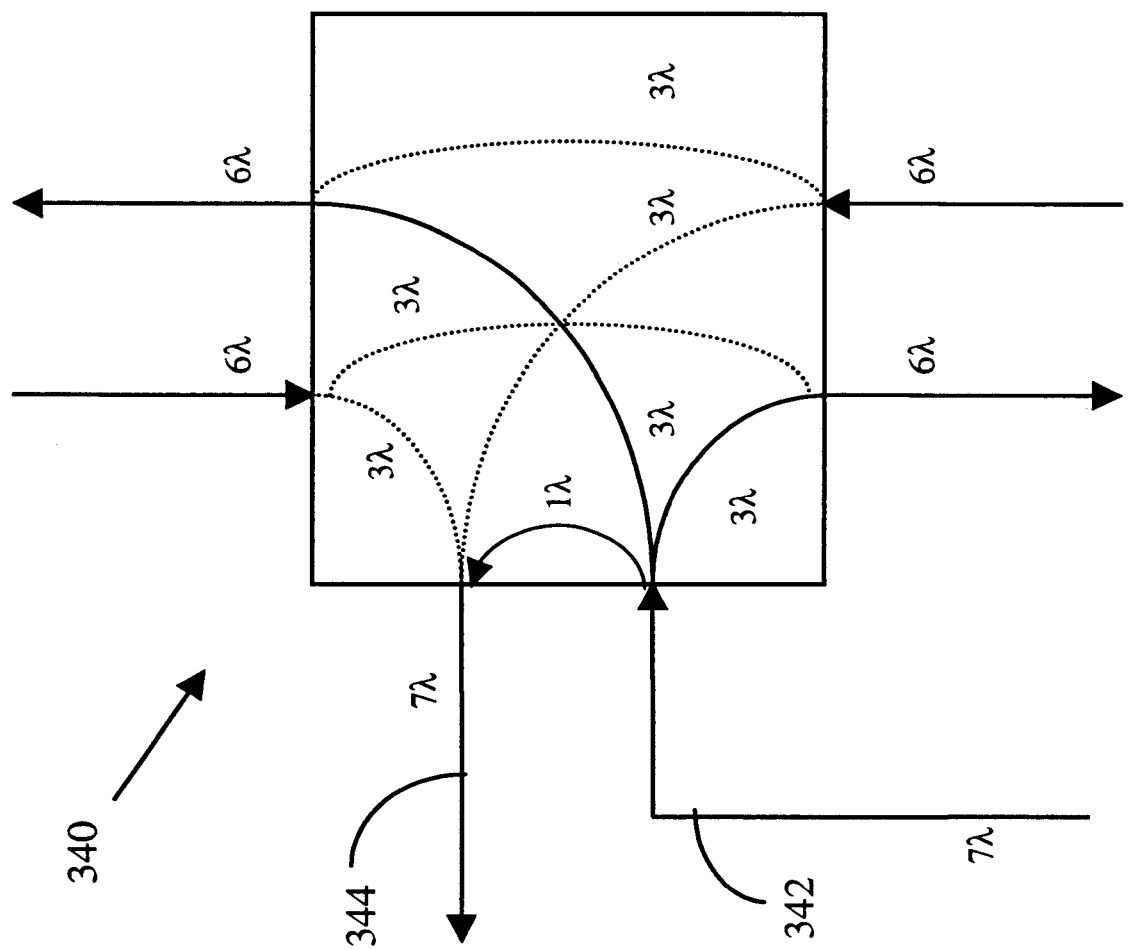
FIG. 23 shows the channel connectivity within an optical node in a configuration such as one shown in FIG. 18.

Similarly, FIG. 23 shows the channel connectivity within an optical node 340 where the incoming fiber link 342 from another counterpart electronic switch carries seven channels, six to be distributed to the other six optical nodes of the dual ring, and one channel to be inserted in the fiber link 344 bound to the associated electronic switch. Like elements in FIG. 23 are designated by like numerals used in FIG. 22. Fiber link 344 carries seven channels, six from the six optical nodes of the dual ring to which it belongs, and one from the incoming fiber link 342.

Figure 24:
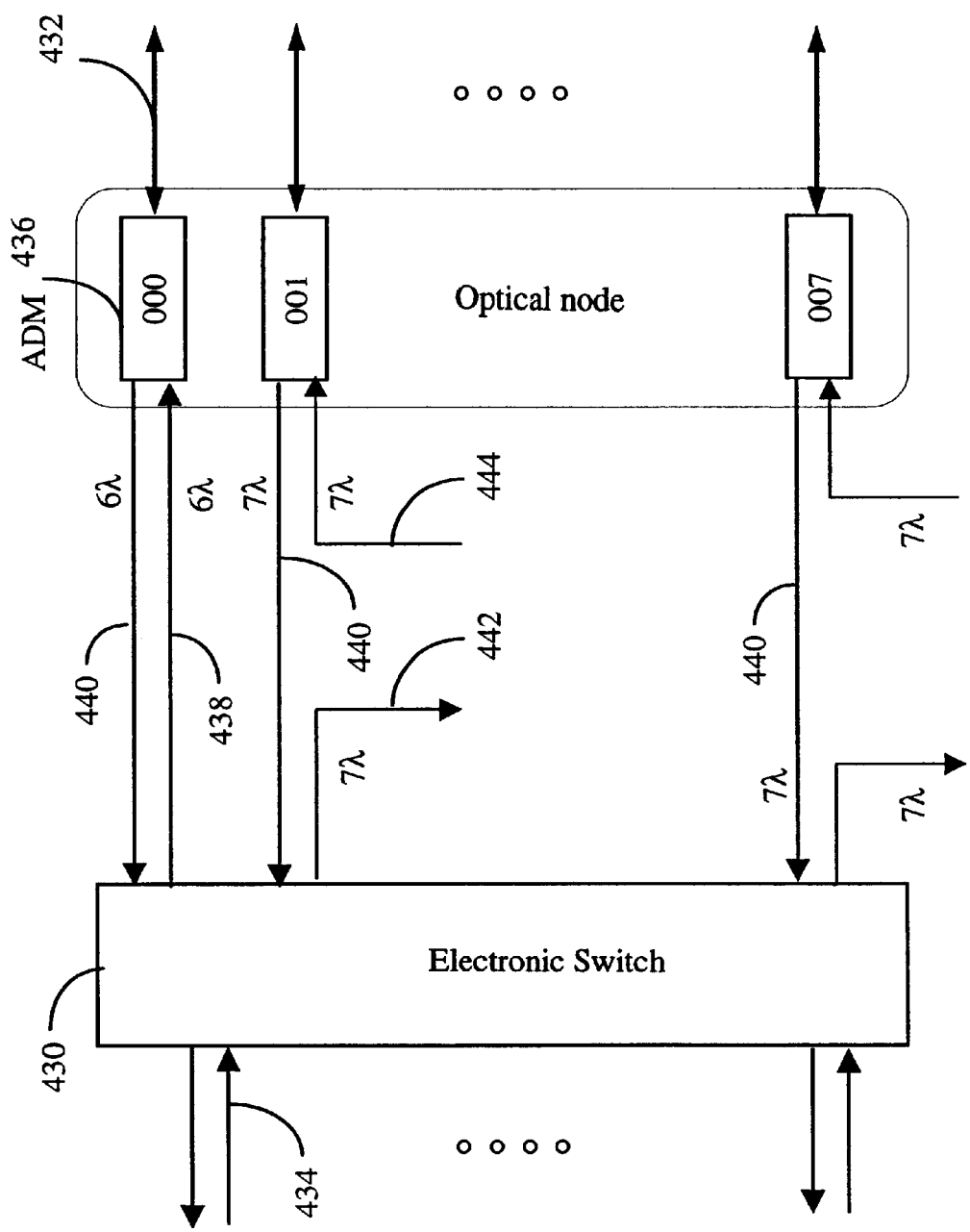
FIG. 24 shows the connectivity of an electronic switch and a set of eight dual rings associated with the electronic switch.

FIG. 24 shows the connectivity of an electronic switch 430 and a set of eight dual rings 432 associated with the electronic switch 430. The electronic switch 430 receives its incoming traffic from its sources through link 434, and from its associated dual rings 432 through an ADM 436. The electronic switch transmits traffic to one of its associated dual rings through a six-channel fiber link 438. It also transmits traffic through fiber links 442, each of which carries seven channels. Each fiber link 442 connects to a single optical port in a dual ring associated with another counterpart electronic switch. Each fiber link 444 carries traffic from a counterpart electronic switch to a dual ring associated with the electronic switch 430. All incoming traffic to the switch 430 is received through the fiber links 440.

Figure 25:
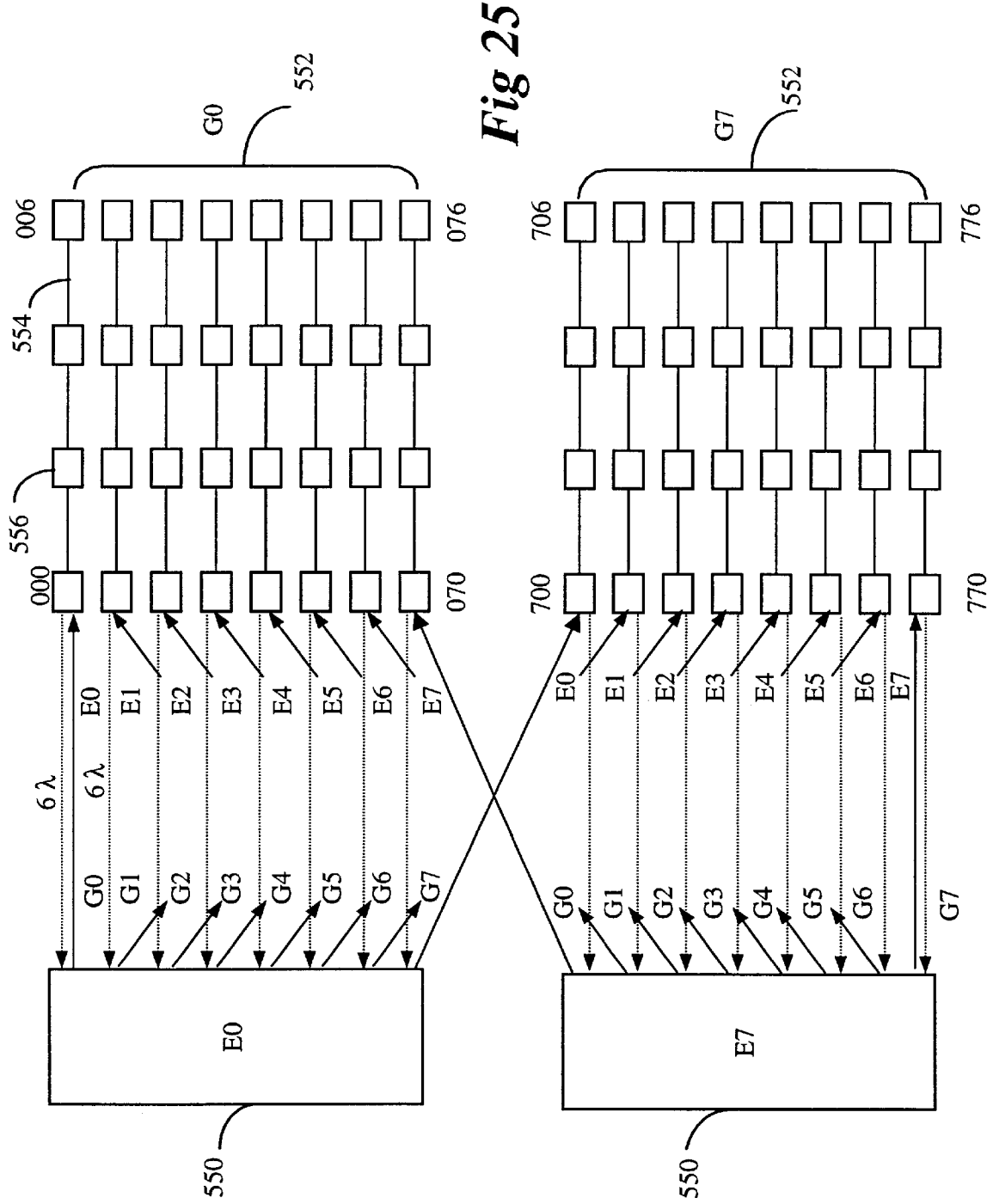
FIG. 25 shows schematically the channel connectivity of the entire network shown in FIG. 21.

FIG. 25 shows schematically the connectivity of the entire network. In the figure, each electronic switch 550 is associated with a set 552 of eight associated dual rings 554 and each dual ring 554 is represented by a line connecting a number of optical nodes 556. If there are seven optical nodes per dual ring, then each set 552 of associated dual rings connect to seven electronic switches.

The optical nodes associated with an electronic switch should preferably be collocated with the switch, since they all deliver their traffic directly to the switch through links 440 of FIG. 24.

In the example of FIG. 25, S=8, T=7, and the number of outgoing channels from each electronic switch to the optical core is 55. The inner capacity of the network is then 55×56 channels, and assuming a channel capacity of 10 Gb/s, the inner network capacity is 30.8 Tera bits per second, with a corresponding outer capacity (the capacity available to users) of about 20.5 Tera bits per second. The capacity increases quadratically with the number of core-interface channels of the electronic switch and linearly with the capacity R of each channel. With S=20, T=7, and R=10 Gb/s, the inner capacity is 139×140×10 Gb/s (194.6 Tb/s), and the corresponding outer capacity would be about 128 Tb/s. (The outer capacity is estimated to be two thirds of the inner capacity.)

Figure 26:
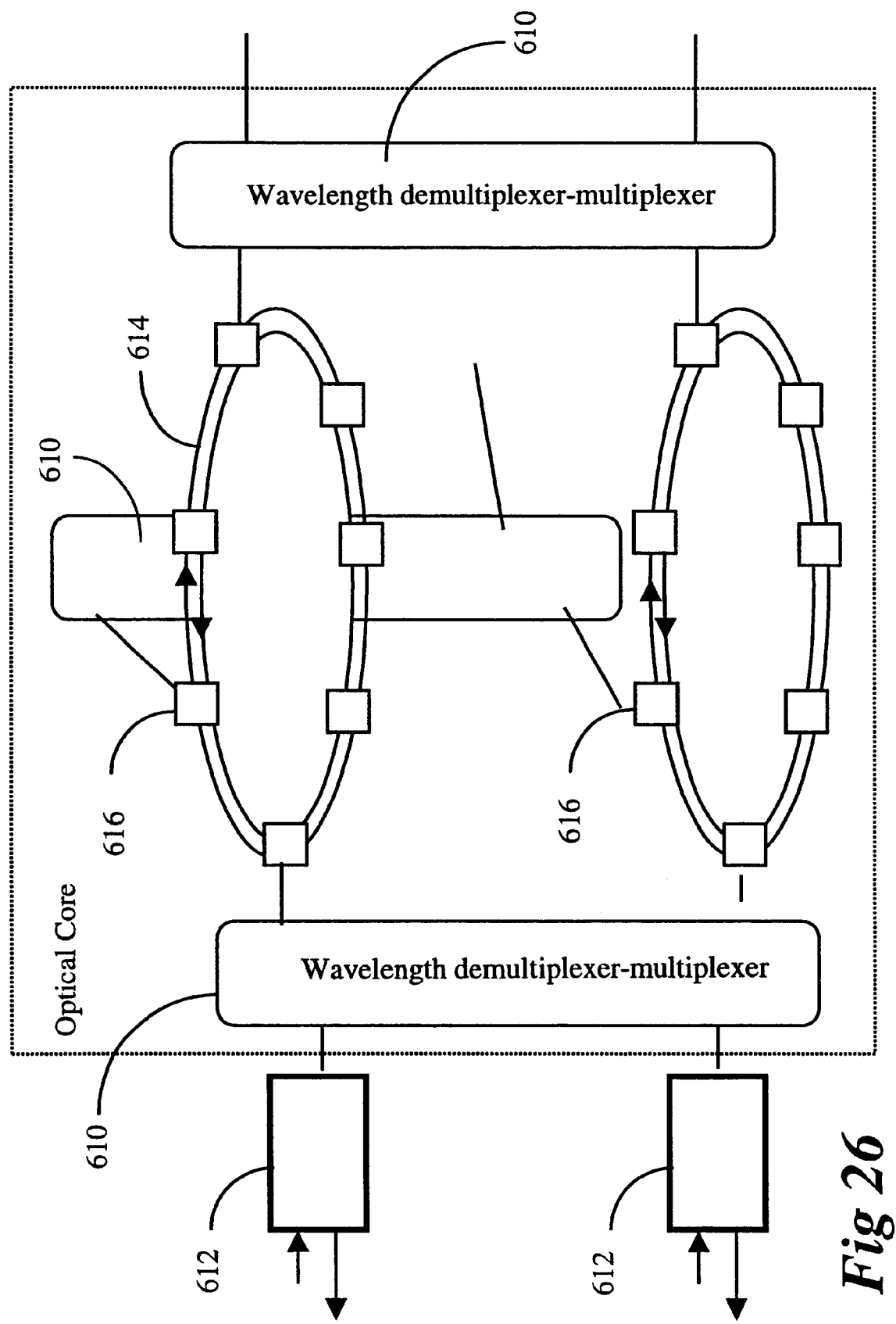
FIG. 26 shows a yet further embodiment in which seven global optical nodes are used to connect the electronic edge switches to the rings.

FIG. 26 shows an alternative access to the optical core where seven global optical nodes 610 are used to connect the electronic switches 612 to the rings 614. There are seven optical nodes in each ring. As mentioned above, if each optical node 616 is to have at least a single direct optical channel to each other optical node, then the number of channels from the electronic edge switches 612 to each optical node 616 should be at least six. The capacity increment per ring is preferably an integer multiple of six. The electronic edge switches in FIG. 18 or FIG. 26 may be spread over a wide area, possibly covering the North-American continent for example. In a WDM application, each electronic edge switch may connect to the global optical node 610 (wavelength multiplexer/demultiplexer) by a small number of WDM fibers. Similarly, the global optical node may connect to each of its designated rings by one or more fiber links, each supporting multiple wavelengths. In a symmetrical configuration, and with a single-fiber connection from each electronic edge switch to its global optical node, the number of electronic switches should be seven times the number of rings G, assuming seven optical nodes per ring. Seven global optical nodes 610 may be used to interconnect the electronic switches to the ring optical nodes. The electronic switches are divided into seven subsets, each containing G switches, and each global optical node may serve one of the switch subsets. If, for example, G=20, and the number of channels, L, from each electronic edge switch to its global optical node, is 120, then the total number of channels shuffled by each global optical node is 2400 and the total inner capacity of the optical core is 16800 channels (7 global optical nodes with 2400 channels each). With a typical 10 Gb/s per channel, the inner capacity is about 168 Tb/s. The corresponding end-to-end (outer) capacity would typically be about 112 Tb/s (reduced from 168 Tb/s due to the possible use of two-link paths as mentioned earlier). Several variations of this configuration can be devised depending on the interconnection pattern between the electronic edge switches, the global optical nodes, and the individual rings. The capacity limit of the network increases quadratically with the capacity of the electronic edge switches; it is the electronic edge switch, not the optical core that limits the capacity of the network.

Figure 27:
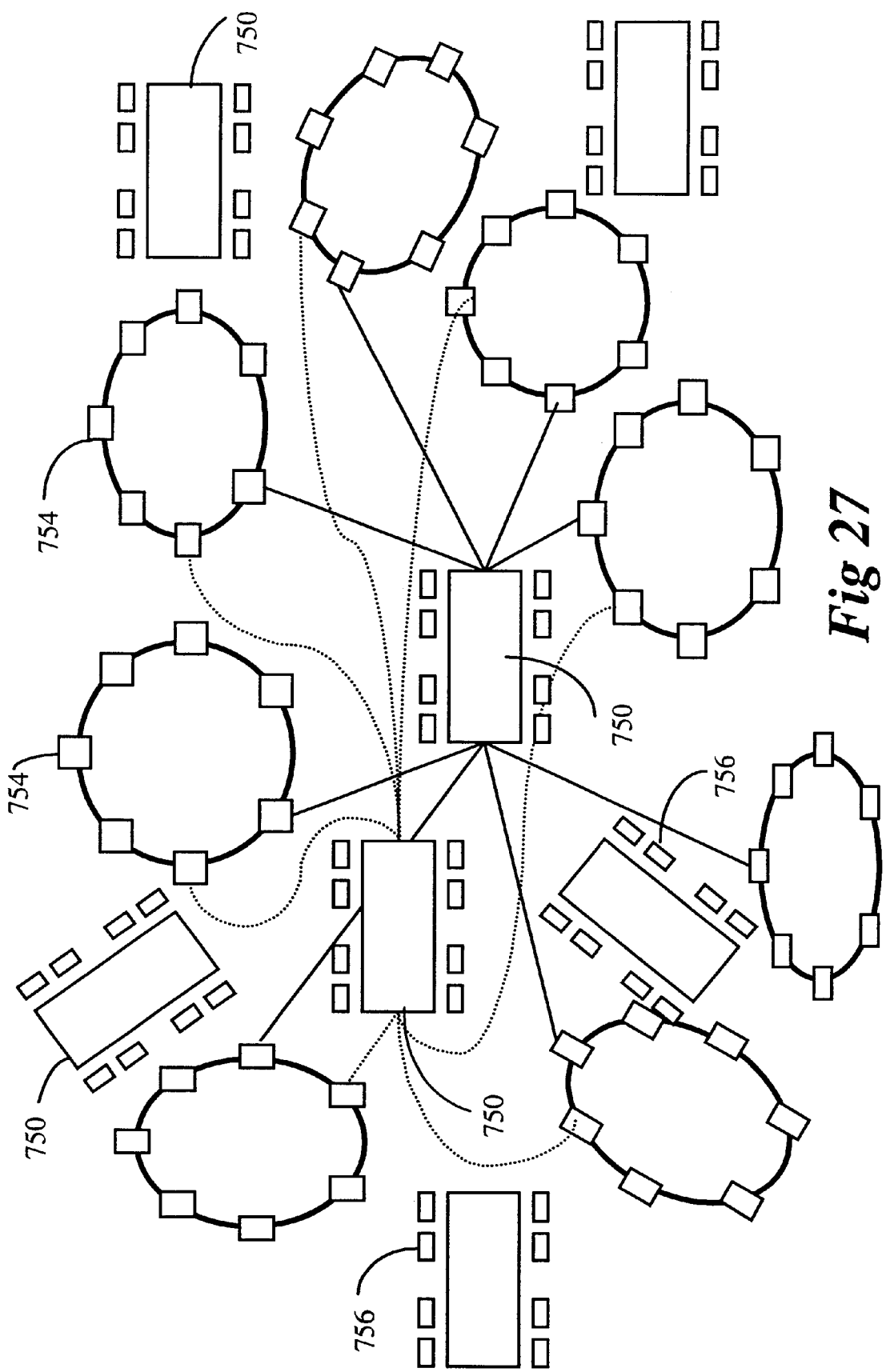
FIG. 27 shows a similar network architecture as that of FIG. 26 but is redrawn differently to illustrate more clearly the geographical expanse of the network.

The schematic of FIG. 18 or FIG. 26 does not show the geographic locations of the individual network components. FIG. 26 may be redrawn in the form of the configuration of FIG. 27. In FIG. 27, seven global optical nodes 750 interconnect eight rings through their associated optical nodes 754, each ring having seven optical nodes. Only two global nodes 750 are illustrated as being connected to rings via optical nodes, one by solid lines and another by dotted lines. Each of the electronic switches 756 (corresponds to switch 612 in FIG. 26), shown as small rectangles, connects to a global optical node by one or more optical fibers (not shown in FIG. 27). Each electronic edge switch can reach each other electronic edge switch through the optical core by a single hop or a two-hop path. An electronic edge switch can send all its traffic to a specific electronic switch via the multiplicity of alternate routes.

Figure 29:
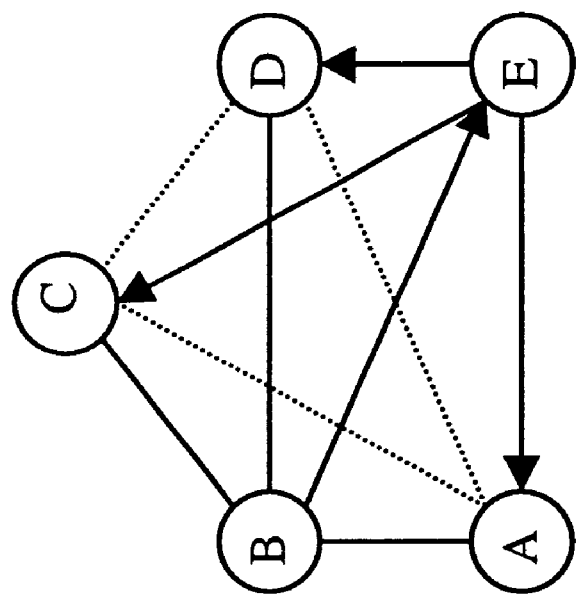
FIGS. 28 and 29 show two examples of multicasting according to embodiments of the invention.
Figure 28:
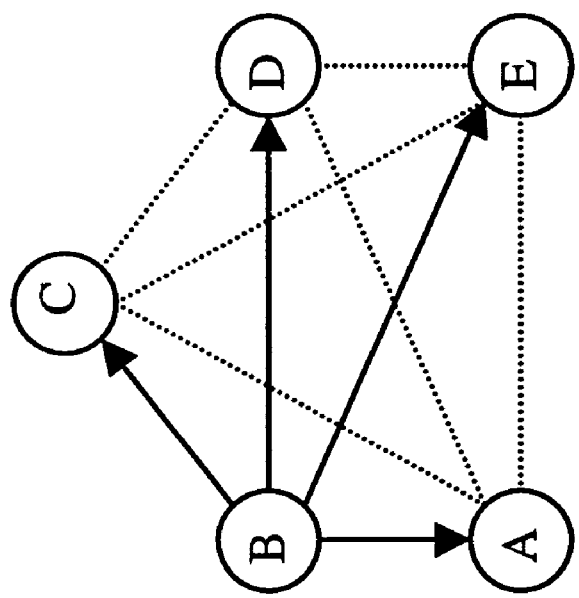

According to another aspect, the architecture of the invention significantly simplifies multicasting. FIGS. 28 and 29 show two of numerous efficient multicasting patterns. An originating electronic edge switch can fan-out directly to each other electronic edge switches. In FIG. 28, node B multicasts to nodes A, C, D and E as shown by arrowheaded lines. The total number of hops is then ν, where ν is the number of receiving electronic edge switches for a given multicast connection. In FIG. 29, the originating electronic edge switch may transfer its multicast data to another relay electronic edge switch, which performs direct multicasting to the remaining receiving electronic edge switches. The total number of hops to effect the multicast is still the minimum of ν. In fact, the property of conserved number of hops in this scheme can be exploited to minimize the overall multicast resource consumption by selecting the appropriate relay node which minimizes the sum of the distances to the receiving electronic edge switches. A number of relay nodes may also be used.

We claim:

1. A large scale communications network comprising:
   (a) a passive optical core transport network comprising a plurality of optical nodes interconnected by optical links, each of said optical links supporting at least one dedicated channel, said optical nodes managing said dedicated channels to form a fully meshed transport network; and
   (b) a plurality of electronic edge switches, each communicating with one of the plurality of optical nodes;
   wherein a source electronic edge switch processing digital traffic forms at least one path through at least one of said dedicated channels to a destination electronic edge switch.

2. The communications network of claim 1 wherein each of said optical links supports multiple wavelengths, wherein one of said wavelengths constitutes one of said dedicated channels.

3. The communications network of claim 1 wherein the plurality of optical nodes is taken from the group consisting of optical shufflers, add/drop multiplexers and optical space switches.

4. The communications network of claim 3, wherein said source electronic edge switch is operable to send data to said destination electronic edge switch through a direct path and any of (N-2) two-hop paths, wherein N is a number greater than unity and represents the number of said electronic edge switches.

5. In the communications network of claim 4, a method for selecting a path of a prescribed capacity requirement from said source electronic edge switch to said destination electronic edge switch, the method comprising:
   (a) determining a cost-index for each path from said source electronic edge switch to said destination edge switch;
   (b) determining the vacancy of each path from said source electronic edge switch to said destination electronic edge switch;

(c) computing a weighted vacancy for each path from said source electronic edge switch to said destination edge switch; and (d) selecting the path of highest weighted vacancy that has a sufficient vacancy to accommodate said prescribed capacity requirement.

6. The method of claim 5 wherein said cost index is proportional to the inverse of an end-to-end cost.

7. The method of claim 5 wherein the group of possible paths from said source electronic edge switch to said destination edge switch includes a direct path and (N-2) two-hop paths.

8. The method of claim 7 including the further step of selecting the direct path over any of said (N-2) two hop paths if said direct path has a sufficient vacancy to accommodate said prescribed capacity requirement.

9. A communications network for transporting digital traffic between a plurality of electronic edge switches through channels in a fully meshed logical configuration, comprising an optical core transport network including a dual ring carrying multiple wavelengths in opposite directions with specifically assigned wavelengths for each specified pair of said plurality of electronic edge switches.

10. The communications network according to claim 9 wherein source and destination electronic edge switches selected from the plurality of electronic edge switches, are connected by a direct path and a plurality of indirect paths.

11. The communications network according to claim 9 wherein said dual ring comprises:

(a) a clockwise ring and a counter-clockwise ring, each having a plurality of optical channels; and (b) a plurality of optical add/drop multiplexers;

wherein each of said optical add/drop multiplexers is connected to said clockwise and counter-clockwise rings and is operable to:

(i) insert optical channels incoming from each of said plurality of electronic edge switches to optical channels in said clockwise and counter-clockwise rings;

(ii) drop optical channels received from said clockwise and counter-clockwise rings to a fiber link bound to each of said plurality of electronic edge switches;

(iii) pass optical channels received from said clockwise ring to a specified one of the plurality of optical add/drop multiplexers; and (iv) pass optical channels received from said counter-clockwise ring to a specified one of the plurality of optical add/drop multiplexers.

12. In the communications network according to claim 11, a method of allocating optical channels of different wavelengths, the method including a step of assigning unique wavelengths: in any ring section between successive add/drop multiplexers in the clockwise ring; in any ring section between successive add/drop multiplexers in the counter-clockwise ring; in the fiber link from an electronic edge switch to an optical add/drop multiplexer; and in the fiber link from an optical add/drop multiplexer to an electronic edge switch.

13. The communications network according to claim 11 wherein said dual ring comprises seven optical add/drop multiplexers, and each of said fiber links connecting said electronic edge switches to associated add/drop multiplexers carries six optical channels in each direction, and wherein said six optical channels provide:

(a) three channels incoming from said electronic edge switch which are inserted in the clockwise ring and three channels which are inserted in the counter-clockwise ring;

(b) three channels incoming from said clockwise ring which are dropped to the fiber link bound to one of said electronic edge switches, and three channels which proceed to an adjacent optical add/drop multiplexer; and (c) three channels incoming from the counter-clockwise ring which are dropped to the fiber link bound to one of said electronic edge switches and three channels which proceed to an adjacent optical add/drop multiplexer.

14. A multi-ring network comprising:

(a) a plurality of electronic edge switches; and (b) a number D of dual rings, each dual ring interconnecting at least T optical nodes;

wherein each of said plurality of electronic edge switches has a wavelength division multiplexing fiber link to one of said at least T optical nodes in each of said D dual rings and a wavelength division multiplexing fiber link from one of said at least T optical nodes;

and wherein each of said at least T optical nodes within a specified dual ring is operable to connect optical channels of a wavelength division multiplexing fiber link to the remaining ones of said at least T optical nodes within said specified dual ring;

and wherein each of said electronic edge switches is operable to direct data through said optical channels to any other of said plurality of electronic edge switches.

15. The network of claim 14 wherein each of said dual rings has the same number T of optical nodes.

16. The network of claim 14 wherein each of said electronic edge switches is connected to at least one of said T optical nodes in each of said dual rings.

17. The network of claim 14 wherein the paths interconnecting any two of the plurality of electronic edge switches comprises at least D optical channels.

18. The network of claim 14 wherein each optical node is an optical add/drop multiplexer.

19. A multi-ring network comprising:

(a) a plurality of edge switches;

(b) an optical core comprising a plurality of dual rings, each of said dual rings including T optical nodes;

wherein said plurality of dual rings is arranged into S ring sets;

and wherein each of said ring sets comprises D dual rings;

and wherein each of said plurality of edge switches transmits data to at least one of said S ring sets;

and wherein each of said plurality of edge switches receives data through specified ones of D optical nodes belonging to a specified one of said S ring sets.

20. The multi-ring network of claim 19 wherein each of said plurality of edge switches has a fiber link to a specified one of said T optical nodes in each of said S ring sets and a fiber link from each of said D optical nodes of a specified one of said S ring sets.

21. The multi-ring network of claim 20 wherein each edge switch is associated with a group of D optical nodes belonging to said D dual rings of the same ring set.

22. The multi-ring network of claim 21 wherein the network includes S×D× T optical nodes.

23. The multi-ring network of claim 22 wherein the number D of dual rings per ring set equals the number S of ring sets.

24. The multi-ring network of claim 23 wherein each of said dual rings has T optical nodes and the network includes S×T edge switches.

25. An edge switch communicating with an optical core transport network for exchanging digital traffic with other edge switches in a meshed logical configuration, comprising:

(a) at least two ingress ports;
(b) at least two egress ports communicating with said at least two ingress ports;

wherein said edge switch communicates with a passive optical core transport network via one of the at least two ingress and egress ports, said transport network comprising a plurality of optical nodes fully interconnected by optical links, each of said optical links supporting at least one dedicated channel, said optical nodes managing said dedicated channels to form a fully meshed transport network;

and wherein said edge switch further includes means for selecting a desired dedicated channel to exchange digital traffic with a specified destination edge switch.

26. The edge switch of claim 25 wherein the edge switch is operable to send data to said destination edge switch through a direct path and any of (N-2) two-hop paths, wherein N is a number greater than unity and represents the number of said electronic edge switches.

* * * * *

UNITED STATES PATENT AND TRADEMARK OFFICE
CERTIFICATE OF CORRECTION

PATENT NO. : 6,339,488 B1
DATED : January 15, 2002
INVENTOR(S) : Beshai et al.

It is certified that error appears in the above-identified patent and that said Letters Patent is hereby corrected as shown below:

Delete columns 1 thru 18 and insert the following attached columns 1 thru 18.

Signed and Sealed this

Thirteenth Day of December, 2005

JON W. DUDAS
*Director of the United States Patent and Trademark Office*

LARGE SCALE COMMUNICATIONS NETWORK HAVING A FULLY MESHED OPTICAL CORE TRANSPORT NETWORK

A large scale communications network having a fully meshed optical core transport network.

FIELD OF INVENTION

The invention generally relates to a large scale telecommunications network employing an optical core transport network of a fully meshed configuration. In particular, it is directed to an architecture of a large scale telecommunications network in which electronic edge switches are connected to a fully meshed optical core transport network and major control functions of each connection are performed substantially by two electronic edge switches of the connection.

BACKGROUND OF INVENTION

The emerging data network must be able to grow to a much-higher capacity than the capacity of today's voice and data networks. In addition to the huge-capacity requirement, the emerging networks must provide diverse and versatile services. The multiplicity of connection protocols, and the effort required for their interworking, inhibit the ability of the network to provide service diversity. The simplest network would be fully connected, allowing every networking node to have a physical connection to every other networking node. However, as the network size grows, this fully-meshed structure rapidly becomes impractical. Due to the spatial variation of traffic loads, and the typically large modular sizes of transport links, a fully-meshed network normally leads to underutilized transport facilities.

Traditional electronic transport systems can offer a meshed network by providing direct interconnections between the networking nodes. However, the connections would be based on channelized time division multiplexing, where the bandwidth allocated to a node-pair is fixed and dedicated to the node-pair, resulting in inflexible bandwidth utilization. A fully-meshed network is not scaleable to cover a large number of nodes, unless the link capacities are elastic and can be modified rapidly to follow the traffic-demand variation. With fixed capacities and fluctuating traffic demand, the transport utilization drops rapidly as the number of nodes increases. An elastic network, however, would allow all the connections to share a common pool of capacity through paths whose capacities are dynamically adjustable.

Both cross-connection-based and ring-based networks can be configured to be fully meshed or almost fully meshed. Their transport mechanisms can also be optical or electronic or a mixture of both.

U.S. Pat. No. 5,802,043, issued Sep. 1*st*, 1998, entitled "Transport Architecture and Network Elements", has an inventor common to the present application and describes one such solution based on an optical ring structure with capacity partitioning. In its realization, a domain is defined where every networking node within the domain is connected to every other networking node within it with fixed or variable capacity. All the connections within the domain share a common pool of capacity, maximizing the utilization of the node interfaces. Various networking nodes which use different protocols, such as ATM or IP, are accommodated by defining a container structure which carries digital information in its native form between them. The containers are carried on a digital facility with a defined bit rate that circulate on a ring or virtual ring past every networking node in the domain.

A pending U.S. patent application Ser. No. 09/116,477 entitled "Programmable Transport and Network Architecture" and filed on Jul. 16, 1998 with the common inventors extends further the meshed networking based on an optical ring configuration. The subject matter is described in an article "Architecture and Control of an Adaptive High-Capacity Flat Network" IEEE Communications Magazine, May 1998. The meshed network of this patent application allows all the connections to share a common pool of capacity through links among nodes whose capacities are dynamically adjustable. Nodes provide data packaging into "containers" of fixed or variable sizes for transport and a ring exchanges data containers among its nodes. A centralized or distributed controller calculates a service rate for each source-destination node pair. Such controller either monitors the traffic or receives updated capacity-allocation requests from the nodes, and assigns an appropriate data rate at which each node can transmit to each destination. With lossless rings (traffic-wise), the quality of service is controlled by the source and destination nodes, without any interference from other data streams within the network. By reducing the complexity of the network core, an economical, reliable, and manageable network with feature-rich edge nodes can be realized.

In the IEEE article referenced above, it was stated that: Unprecedented traffic growth is providing a huge demand for fiber facilities. Not only are the backbone networks outstripping their original design capacities, but the routes will need fiber cable replacements to allow full buildup of high-density WDM. In addition, as the routes grow, there will be further pressures to create better diversity to improve restoration. Currently, WDM is primarily used to increase point-to-point transport capacity. The abundance of transport bandwidth due to WDM may justify a highly-meshed topology at wavelength granularity. However, due to the spatial traffic variation and with wavelength switching, a wide-coverage network may still require tandem switching and capacity-sharing controls, which are now realized electronically. Two dimensional space-WDM switching nodes may be used to realize, at a wavelength granularity, either a partially-interconnected network or a fully-meshed network.

WDM stands for wavelength division multiplexing and refers to the technique of sending simultaneously a beam or beams of light of more than one wavelength through one optical fiber.

In U.S. Pat. No. 5,751,454 May 12, 1998, MacDonald et al, an optical ring network communication structure is described in which multiple wavelengths travel in one direction and wavelength Mux/Demux is performed at each node. In addition to being able to add and drop any wavelength, however, each node also has the ability to bypass selected wavelengths. By bypassing selected nodes, a direct channel of one wavelength can be provided between any node pair if the total number of nodes on the ring is relatively small.

U.S. Pat. No. 5,760,935 Jun. 2, 1998 Sabry et al describes an optical communications network in which information is transported through hierarchically configured networks via pixels in a discrete communications space defined by time and wavelength coordinates.

In U.S. Pat. No. 5,760,934 Jun. 2, 1998 Sutter et al describes an optical ring network using wavelength division multiplexing technique.

Generally speaking, a network with N nodes requires a minimum of $N(N-1)$ paths to achieve a fully meshed configuration, where there is always a dedicated path available in each direction for each of a node pair. For example, in the case of 7 nodes in a network, 42 unidirectional paths are needed for all the possible node pairs, resulting in 21 bidirectional paths.

According to a broad aspect, the present invention realizes a fully meshed network, which provides an end-to-end path of an arbitrary capacity for each node pair. The capacity of each path may be dynamically modified in response to traffic loads and other network conditions. Each node must then sort its traffic according to destination, into logical buffers, and regulate the rate at which traffic is sent from each buffer.

In U.S. Pat. No. 5,760,934 Jun. 2, 1998 Sutter et al describes an optical ring network using wavelength division multiplexing technique.

OBJECTS OF INVENTION

It is therefore an object of the invention to provide a fully meshed telecommunications network in which an optical core transport network is used and a channel is managed by a pair of electronic edge switches at the ends of the channel.

It is a further object of the invention to provide a fully meshed telecommunications network in which an optical dual ring is used as the core transport network and a channel is managed by a pair of electronic edge switches at the ends of the channel.

It is another object of the invention to provide a fully meshed telecommunications network in which an optical dual ring is used as the core transport network and carries wavelength multiplexed optical signals.

It is yet an object of the invention to provide a fully meshed telecommunications network in which an end-to-end rate regulation is performed between a pair of electronic edge switches.

It is still a further object of the invention to provide a fully meshed telecommunications network in which a multiple of optical dual rings, operating in parallel, is used as the core transport network and carries wavelength multiplexed optical signals.

SUMMARY OF INVENTION

Briefly stated, according to one aspect, the invention is directed to a large scale communications network comprising: a passive optical core transport network comprising a plurality of optical nodes interconnected by optical links, each of the optical links supporting at least one dedicated channel, the optical nodes managing the dedicated channels to form a fully meshed transport network; and a plurality of electronic edge switches, each communicating with one of the plurality of optical nodes; wherein a source electronic edge switch processing digital traffic forms at least one path through at least one of the dedicated channels to a destination electronic edge switch.

According to another aspect, the invention resides in a method for selecting a path of a prescribed capacity requirement from the source electronic edge switch to the destination electronic edge switch of the communications network described above, the method comprising: determining a cost-index for each path from the source electronic edge switch to the destination edge switch; determining the vacancy of each path from the source electronic edge switch to the destination electronic edge switch; computing a weighted vacancy for each path from the source electronic edge switch to the destination edge switch; and selecting the path of highest weighted vacancy that has a sufficient vacancy to accommodate the prescribed capacity requirement.

According to a further aspect, the invention is directed to a multi-ring network comprising: a plurality of electronic edge switches; and a number D of dual rings, each dual ring interconnecting at least T optical nodes; wherein each of the plurality of electronic edge switches has a wavelength division multiplexing fiber link to one of the at least T optical nodes in each of the D dual rings and a wavelength division multiplexing fiber link from one of the at least T optical nodes; and wherein each of the at least T optical nodes within a specified dual ring is operable to connect optical channels of a wavelength division multiplexing fiber link to the remaining ones of the at least T optical nodes within the specified dual ring; and wherein each of the electronic edge switches is operable to direct data through the optical channels to any other of the plurality of electronic edge switches.

According to yet another aspect, the invention is directed to an edge switch communicating with an optical core transport network for exchanging digital traffic with other edge switches in a meshed logical configuration, comprising: at least two ingress ports; at least two egress ports communicating with the at least two ingress ports; wherein the edge switch communicates with a passive optical core transport network via one of the at least two ingress and egress ports, the transport network comprising a plurality of optical nodes fully interconnected by optical links, each of the optical links supporting at least one dedicated channel, the optical nodes managing the dedicated channels to form a fully meshed transport network; and wherein the edge switch further includes means for selecting a desired dedicated channel to exchange digital traffic with a specified destination edge switch.

BRIEF DESCRIPTION OF DRAWINGS

FIG. 1 is a schematic of an optical core-electronic edge network 10 in accordance with one embodiment of the invention.

FIG. 2 is a schematic which illustrates the capacity usage of an electronic edge switch.

FIG. 3 illustrates the traffic distribution, using a simple case of four electronic edge switches.

FIG. 4 shows an example of an eight-node network for which a path outing process will be described.

FIG. 5 depicts the path-routing process used to select an end-to-end path in the network of FIG. 4, according to network occupancy as well as link cost indices.

FIG. 6 shows schematically a simple implementation of the network of FIG. 1, using a ring structure, according to one embodiment.

FIG. 7 shows one possible channel (wavelength) allocation among the optical nodes in the clockwise direction.

FIG. 8 is a similar allocation to that in FIG. 7 but in the counter clockwise direction.

FIG. 9 is a wavelength allocation in the case of multiples of six wavelengths incoming to each optical node in the clockwise direction.

FIG. 10 is a similar allocation to that in FIG. 9 but in the counter clockwise direction.

FIG. 11 is a functionally equivalent illustration of the network shown in FIGS. 7 and 8.

FIG. 12 depicts the allocations for wavelengths #0 to #5 in a tabular form.

FIG. 13 shows an example of a classical optical shuffler.

FIG. 14 shows a more generalized form of the optical shuffler of FIG. 13.

FIG. 15 is a schematic illustration of a common-memory module.

FIG. 16 is schematic illustration of operation of containers sorted according to destination module and transferred to middle buffers accordingly.

FIG. 17 is a schematic illustration of a core of a high-capacity container switch.

FIG. 18 illustrates a multiple ring configuration according to a further embodiment in which two or more rings are operated in parallel and each electronic switch can access each of the rings.

FIG. 19 shows one embodiment of the multiple ring architecture.

FIG. 20 is an illustration of a group of multiple optical nodes in one ring set.

FIG. 21 shows one embodiment in which an optical core of a network comprises eight ring sets.

FIG. 22 illustrates the channel connectivity within an optical node in a configuration such as that shown in FIG. 6.

FIG. 23 shows the channel connectivity within an optical node in a configuration such as one shown in FIG. 18.

FIG. 24 shows the connectivity of an electronic switch and a set of eight dual rings associated with the electronic switch.

FIG. 25 shows schematically the channel connectivity of the entire network shown in FIG. 21.

FIG. 26 shows a yet further embodiment in which seven global optical nodes are used to connect the electronic edge switches to the rings.

FIG. 27 shows a similar network architecture as that of FIG. 26 but is redrawn differently to illustrate more clearly the geographical expanse of the network.

FIGS. 28 and 29 show two examples of multicasting according to embodiments of the invention.

DETAILED DESCRIPTION OF PREFERRED EMBODIMENTS OF INVENTION

Although as mentioned earlier, a fully meshed transport core network can be realized electronically, optically, or in a combination of both, an optical construction is becoming more prevalent in future network architecture and it is natural to use optical arrangement for the core network for the present invention. FIG. 1 is a schematic of an optical core-electronic edge network 10 in accordance with one embodiment of the invention. The network 10 comprises an optical core transport network 12 having a number of optical nodes 14 which are fully interconnected (meshed) by optical links 16. Each optical link supports at least one dedicated channel and therefore, each optical node is connected to each other optical node by at least one dedicated channel. A number of electronic edge switches 18, each connected to an optical node 14, interface between the network 10 and any external networks or terminals. In one particular embodiment, each optical link can be realized by a multi-wavelength optical circuit which supports a multiple of wavelengths, one wavelength constituting a dedicated channel. The entire optical core transport network is passive in the sense that no dynamic routing of channels, signal conversions, such as wavelength conversion etc., take place.

Each electronic edge switch 18 receives digital traffic from local sources through incoming access links 20 and delivers data destined to local sinks through outgoing access links 22. Each electronic edge switch connects to an optical node through optical circuits 24 and 26 (or a bidirectional circuit 28) which support a number of channels. Therefore the dedicated channel between any pair of optical nodes can extend to their associated electronic edge switches, resulting in at least one dedicated channel between any pair of electronic edge switches. The optical nodes thus only shuffle respective channels received from their electronic edge switches to respective optical nodes. It is therefore noted that an optical node can be an optical shuffler, an optical ADM (add/drop multiplexer) or an optical space switch. Optical WDM add/drop multiplexers are now readily available and come with a variety of capabilities in that with x+y wavelengths in a WDM link, an ADM adds or drops x wavelengths and passes through y wavelengths. The use of optical space switches instead of simple shufflers or ADMs increases the network efficiency at the expense of control complexity. In the following description, only channel shufflers or ADMs will be considered and described. In terms of function, channel shufflers and ADMs are very similar and therefore they are used synonymously in the specification.

While at least one direct channel is provided between any pair of electronic edge switches, it is possible to establish a path between the electronic edge switches using the direct channel or multi-hop channel or a combination of both. A path may occupy all the bandwidth of the channel or a portion thereof, with remaining portion being assigned to a different path. A multi-hop channel involves one or more intermediate nodes and is formed in two or more sections (a section is a link between two successive optical nodes in a ring). Therefore referring to FIG. 1, a direct channel (or link) 16 spans between optical nodes B and C. A path can also be made between nodes B and C by using a multi-hop channel, involving a specifically dedicated channel 30 between nodes B and D and another specifically dedicated channel 32 between nodes D and C. Optical node D therefore receives traffic destined to node C through its channel dedicated between nodes B and D and according to a prior routing arrangement, its electronic edge switch returns the traffic onto a channel 32 dedicated between nodes D and C. While two or more intermediate nodes can be used, a maximum of two hops (with one intermediate node) is preferred, because it appears that three or more hop channels would unduly complicate the network management without apparent benefits.

An edge switch takes in all the traffic from any local nodes and diverts some to the optical node (which is an optical shuffler or ADM) on the optical core and some other back to local nodes. It also takes in traffic from the optical shuffler or ADM on the core and diverts some to the local nodes and some other back to the core through the optical shuffler or ADM. One example is illustrated in FIG. 2. A channel is created between a pair of electronic edge switches. All the traffic control of the channel is performed by these pair of electronic edge switches, including rate control, QOS (quality-of-service) control, etc. Because the established paths are rate-regulated, in establishing individual connections within a path, the sending electronic switch in a two-hop channel need not be aware of the occupancy condition of the electronic switch associated with the intermediate optical node.

It is noted that the number of optical nodes per ring should be relatively small. The efficiency of the ring drops as the number of the optical nodes increases. The configuration described thus far, however, greatly simplifies packet processing in a data network and facilitates network scalability to hundreds of tera bits per second by connecting several rings in parallel. One of the advantages of this architecture is the effective sharing of the optical core capacity. Only a global traffic overload can lead to a noticeable delay. Global overload in any network, particularly a network of wide geographical coverage, is a rare event and—even then—the performance with the proposed architecture is acceptable. Under typical overload conditions good performance is realizable with an efficient routing method.

FIG. 2 illustrates in detail the traffic flow within an electronic edge switch 40. The traffic received from an ingress port 42 may be split into two streams, a stream 44 directed to egress ports 46 of the same switch, and another stream 48 directed towards the optical core through ports 50. The traffic received from a port 52, incoming from the optical core, may be split into two streams, a stream 54 directed towards the egress ports 46, and another stream 56 returning to the optical core and directed to various destinations.

If each electronic edge switch connects only to one optical node, then, in a network of N electronic edge switches, N being an integer greater than unity, the set of paths from an electronic edge switch to another electronic edge switch includes one direct channel and (N−2) two-hop channels.

FIG. 3 illustrates the traffic distribution, using a simple case of four electronic edge switches (switch 0–switch 3). Only the case of single-access (where an optical node supports one electronic switch) is considered here. Matrix 60 indicates the volume of traffic, measured in arbitrary units; a unit may represent 100 Mb/s for example. In this example, switch 0 has 40 units destined to switch 1, 160 units destined to switch 2, etc., the total demand being 1200 units. Matrix 62 shows the direct capacity for each switch pair. This is the capacity of each optical channel as determined by its associated electronic switch, the total capacity being 1200 units also in this example. Each entry in matrix 64 is the lesser of the two corresponding entries in matrices 60 and 62. In other words, each entry in matrix 64 closely represents the volume of the directly-routed traffic if an ideal routing algorithm is employed, the total volume being 880 units. An ideal routing algorithm ensures that all traffic that can be transported on a direct one-hop channel is routed as such. Matrix 66 represents the volume of traffic that must use two hops to destination, the total volume being 320 units. As stated above, in this example, the volume of the total traffic is 1200 units, the available capacity is 1200 units, the total internal traffic in the networks amounts to 1520 (880+2×320) units which is the sum of 880 units of directly-routed traffic plus double the two-hop traffic. The total internal traffic therefore exceeds the available capacity. This suggests that an internal capacity expansion, of at least 25% in this case, is required to accommodate the total demand.

Describing further the construction of the invention, channels are set dedicated to each pair of electronic edge switches, and paths (logical channels) are established prior to connection establishment using the channels. Optical nodes are simple ADM or shufflers of channels. While an optical node and its associated electronic edge switch can be far apart at any length, spanning for example many thousands of miles, it is advantageous to place them within the vicinity of one another as will be explained later.

In the following description, in a single access configuration, the term "switching node" is used to refer to an electronic edge switch and its associated optical node. The selection of end-to-end path is determined according to network occupancy as well as link cost indices. The cost index chosen here reflects the end-to-end cost in such a way that the higher the cost, the lower the cost index. A direct path, for example, is often the least expensive and may then be assigned a datum value of 100. If we choose the cost index to be inversely proportional to the cost, then a two-hop path which costs 1.6 times the direct path, for example, would have a cost index of 0.625. The cost indices may be modified to reflect changing network connectivity but are almost static. Other more elaborate formulae may be used to determine the cost indices. Route selection based on the cost indices is illustrated in FIGS. 4 and 5 in which FIG. 4 shows an example of 8 node network 70. In the figure, a path is being established between node 2 and node 5. FIG. 5 depicts the path-routing process in the network of FIG. 4. Each node stores a matrix of cost indices of the two-hop links. For example, referring to FIG. 5, array 80 is a row in the matrix of cost indices stored in node 2. The array shows the cost indices for paths to node 5. The direct path is the datum and is allocated an index of 100. The higher the value of the index the lower is the cost of the path. The cost index for the two-hop path via node 6, for example, is 74 while the cost index for the two-hop path via node 4 is 64. This means that the route via node 4 is more expensive than the route via node 6. Array 82 stores the available free capacity in each path. The free capacity of a two-hop path is defined as the lesser of the free capacities of its two links. Array 84 stores the weighted vacancy for each path from node 2 to node 5. This is the product of the absolute vacancy and the cost indices. The path routing decisions are based on the weighted vacancy. Thus, the underlines in array 84 indicate that the first two choices, after the direct path, would be by way of node 1 and by way of node 6 respectively.

Let the total number of dual ports of the electronic switch be P. The switch is assumed to be symmetrical with P ingress ports and P egress ports. A pair of ingress port and egress port is hereafter called a dual port. Let us further assume that the ports are identical, with a capacity of R bits per second each, which is also the capacity of a link emanating from a port. Let the number of ports interfacing with the subordinate traffic sources be m. The remaining P-m ports interface with the optical core. A link emanating from a port constitutes a channel. The P-m channels from the electronic switch can connect to a maximum of P-m other electronic switches. Thus, the maximum number of electronic switches that can be fully connected to a given switch is P-m+1. The corresponding total capacity of such a network is then C=m(P-m+1)R. The unconstrained maximum capacity, with no conditions imposed on the ratio m/P is realized when m=(P+1)/2 and is equal to $R(P+1)^2/4$, if P is an odd number. Otherwise, the maximum capacity is realized with m=P/2 or m=(P/2)+1, and is equal to C=RP(P+2)/4.

It may be necessary, however, that the number, n (n=P-m) of ports interfacing with the optical core be larger than the number, m, of ports interfacing with the traffic sources, in order to accommodate the transit traffic. The transit traffic is indicated in FIG. 2 as the traffic from ports 52 to ports 50. It is noted that the volume of the transit traffic would normally be larger than the volume of the intra-switch traffic indicated by the reference sign 44 of FIG. 2. The ratio of the core interface capacity to the source interface capacity depends on the volume of intra-switch traffic, and the imbalance of the spatial traffic distribution. The maximum ratio n:m required with severe imbalance is 2:1. In a typical network, an n:m ratio of about 3:2 should suffice. With this ratio, the number of ports interfacing with the traffic sources would be m=0.4P (rounded to the nearest integer), and the maximum network capacity would be approximately: $C=(0.24P^2+0.4P)R$, which is very close to the unconstrained maximum derived above.

Consider, for example, an electronic switch having 128 dual ports (P=128), and m=52 ports, with 76 dual ports interfacing with the optical core. The maximum network capacity is realized when each switch is connected to each other switch by only a single channel. In this example, the number of electronic switches in the network would be 77 and the maximum capacity available to the traffic sources would be 4004R (52×77×R). With R=10 Gb/s, this maximum capacity is then about 40 Tera bits per second. In the extreme-imbalance case where the ratio of n:m is 2:1, 43 ports would interface with the traffic sources and 85 ports interface with the optical core. The maximum number of electronic switches in a fully-connected network would be 86 and the maximum capacity, with R=10 Gb/s would be 36.98 Tb/s.

As mentioned above, the highest capacity is attained when n=m. A configuration with m=n can not be used with spatial traffic imbalance. However, it offers an interesting reference point. With P=128, the highest capacity is C=RP (P+2)/4. With R=10 Gb/s, this capacity is 41.6 Tb/s.

It is seen from the above example that the capacity limit does not change significantly when the ratio n:m changes within practical bounds. The main consequence of increasing the n:m ratio is the increase in the number of electronic channels required to realize the highest capacity fully-connected network. The ratio n:m is a function of traffic imbalance as mentioned earlier.

FIG. 6 shows schematically a simple implementation of the network of FIG. 1, using a ring structure, according to one embodiment. A dual ring 120, with more than one optical channel in each direction, can connect several optical nodes 122 in a fully meshed configuration having at least one dedicated channel between any node pair. Each optical node 122 is connected to an electronic edge switch 124. A dual ring comprises two rings of opposite directions. Each node on a dual ring connects to both rings. A dual ring is used to avoid looping around a large segment of the ring. For example, in FIG. 6, optical node A (which is a simple ADM or shuffler A) would have to use five intermediate optical nodes to reach optical node G if the ring was unidirectional in the clockwise direction. In the dual ring shown, optical node A reaches B, C, and D in the clockwise direction and G, F, and E in the counterclockwise direction.

Each of the optical circuits 126 and 128 between an electronic edge switch and its associated optical node comprises multiple channels. Therefore, an electronic switch with n ports interfacing the optical core may multiplex the signals from the ports onto WDM fibers in bundles of k wavelengths per fiber. The value of k is technology dependent. If, for example n=72, and using fiber links supporting eight wavelengths each (k=8), then nine WDM fiber links are used to interconnect with the core. The optical channels are allocated in such a way as to grant each electronic edge switch at least one optical channel to one of the optical nodes (optical ADMs) associated with each other electronic switch. In FIG. 6, WDM fibers are shown in the ring with six wavelengths, #0 to #5.

For example, for a network with seven nodes on a ring in one direction as shown in FIG. 6, only six channels (wavelengths) are required in each ring and the maximum hop count for any channels is three. Each optical node receives six wavelengths, to be delivered to the other six optical nodes, and drops six wavelengths, one wavelength from each of the other optical nodes in the same ring to be delivered to the associated electronic switch. One possible channel (wavelength) allocation among the optical nodes in clockwise direction is shown in FIG. 7. A similar allocation in the counter clockwise direction is illustrated in FIG. 8. In FIGS. 7 and 8, channels #0, #1, etc., originating at node A are designated as A0, A1, etc. Thus channels #0 to #5 are added at node A and are appropriately shuffled to each of the six destination optical nodes. In particular, the shuffle pattern is preset so that channels #0, #3 and #4 are added on the clockwise ring to be dropped at nodes D, C, and B, respectively. The remaining channels are added on the counter-clockwise ring to reach proper destination nodes with minimum hops. As shown in the figure, only six channels, #0 to #5 are sufficient in each of the two directions to provide a fully meshed configuration with the maximum of two intermediate (pass-through) optical nodes. Each of the incoming and outgoing optical circuits 130 and 132 carries at least six wavelengths (channels). Wavelength allocation in the case of multiples of six wavelengths incoming to each optical shuffler follows the same pattern for each group of six wavelengths. As shown in FIGS. 9 and 10, the allocation for incoming wavelengths #6 to #11 bears a one-to-one correspondence to the allocation for wavelengths #0 to #5.

Functionally, FIGS. 7 and 8 can be redrawn as in FIG. 11 in which the channels are shuffled, or added and dropped, in a prefixed pattern among the nodes. In the configuration, six channels are added at each node, of which one channel is dropped at each of the other nodes. The shuffle pattern may be dynamically variable. FIG. 12 depicts, in a tabular form, the allocations for wavelengths #0 to #5 in the ring of seven optical shufflers, in the clockwise direction as well as in the counter-clockwise direction. Such a tabular form may be used as a tool for devising the wavelength allocations.

The wavelength allocations shown are devised so as to satisfy the condition that no duplicate wavelengths should appear in any fiber section (between successive optical shufflers) or in any outgoing fiber (towards the electronic switch, directly or through a global shuffler). Channel allocations other than those shown in FIGS. 7–10 may be possible.

FIG. 13 shows an example of a classical optical shuffler. In this example, there are four incoming fiber links a, b, c and d, each supporting four wavelengths a0–a3, b0–b3, c0–c3 and d0–d3. A wavelength represents a channel. Four wavelength demultiplexers 150 are used and the individual channels are shuffled. Four multiplexers 152 multiplex received wavelengths onto each of four outgoing fibers. The pattern of shuffle is such that each outgoing fiber carries four wavelengths, one from each of the incoming fibers. In the case of the dual WDM ring, such as the ring shown in FIGS. 6–10, a shuffler shown in FIG. 14 is used in which the inputs to the shuffler are the clockwise fiber link 230, the counter-clockwise fiber link 232, and the incoming fiber 234 from the electronic switches, which may be directly connected or connected through a global shuffler. The shuffled output is distributed to the clockwise fiber link 236, the counterclockwise fiber link 238, and the fiber link 240 to the electronic switches. FIG. 14 shows the interconnection of the demultiplexers 242 and multiplexers 244. The global shufflers will be described later. In this example, each fiber carries the minimum of six wavelengths. As mentioned earlier, the wavelength allocations shown in FIGS. 7 and 10 are devised so as to satisfy the condition that no duplicate wavelengths should appear in any fiber section (between successive optical shufflers) or in any outgoing fiber (towards the electronic switch, directly or through a global shuffler).

An edge switch receives traffic from local sources as well as from the optical core and it decides to transmit it to the local destination or to the optical core. At each ingress port in each node, external traffic is buffered in separate queues according to destinations and other criteria.

Control signals are sent to establish a path between a source node and a destination node. As mentioned earlier, more than one path can be assigned to a node pair at one time. A distributed control or central control scheme is possible for path assignment, setting up and tearing down. The two end nodes agree on the rate allocations of each traffic path within the channel. At each node, a rate control mechanism for each channel regulates the rate allocation for the aggregate traffic directed to the same destination.

Feature rich edge switches control the characteristics of the connection including the QOS and this avoids the complexity of having to deal with it at intermediate nodes. When end-to-end bandwidth demand can not be accommodated for all node-pairs, distinction based on some class or other criteria is required for acceptance of new capacity demands. The QOS may have several interpretations. The network architecture of the invention allows the QOS to be defined on a node-pair basis.

The modification of the end-to-end capacities of established paths would normally take place at a rate that is substantially slower than the rate of transaction processing at the end nodes. For example, the capacity of a given path may be modified every 10 milliseconds while the sending end node of the path may be transmitting packets at the rate of 10000 packets per millisecond. The capacity of a path may be modified in response to admission control requirements or it may be modified according to the level of occupancy of the buffers at the originating node.

A very-high capacity container switch is needed to interconnect the channels in a WDM multi-fiber ring. Large container switches, with capacities ranging from 40 Gb/s to 20 Tb/s are realizable using a rotator-based core architecture. Several alternate realizations are possible.

A rotator-based electronic switch comprises m inlet modules, m middle buffers, and m outlet modules. In a multi-wavelength application, each inlet module comprises a wavelength demultiplexer and a common-memory switch. A relatively-high capacity is attainable with a large container width, of 1024 bits for example. The common-memory inlet multiplexer is depicted in FIG. 15. Such a rotator-based electronic switch is described in detail in U.S. Pat. No. 5,745,486, Apr. 28, 1998, Beshai et al, which has one of the present inventors as a coinventor. In FIG. 16, at each inlet port 260, the containers are sorted according to their outlet ports to facilitate their assignment to the middle buffers 262. The middle buffer is partitioned into bins, each assigned to each output port. The figure also shows data 264 waiting for transfer to outlet, those 266 that have been transferred to the middle buffer, and those 268 that are to be transferred or being transferred to the middle buffer. FIG. 17 shows middle buffers 270, an inlet rotator 272 and an outlet rotator 274. Through the inlet rotator, the inlet modules cyclically access the middle buffers. Each inlet module transfers a number of containers, which may be addressed to different outlet ports, during its access time. A guard time may be needed for transition from one middle buffer to the next. Multi-container transfer per access interval is desirable in order to reduce the relative overhead of the guard-time between transitions from one middle buffer to the next. In FIG. 16, each middle buffer is 1024-bit wide. With 25 nsec access time, the transfer capacity per middle buffer is about 40 Gb/s.

Using a container of 1024 bits and 25 nsec memories, for example, it is possible to construct a 5.12 Tb/s rotator-based switch (m=128) with a maximum systematic delay of the order of a few microseconds. The systematic inlet-outlet delay of a rotator-based switch is described in U.S. Pat. No. 5,745,486 (Beshai et al). The switch serves only, rate-regulated service with the rate per connection being an arbitrary value. The containers are well spaced in time, resulting in a very-high utilization of the order of 0.98 of the port capacity.

In the switch of FIG. 17, a switch scheduler periodically receives the required inlet-outlet rates, as well as information on the number of waiting containers per inlet-outlet pair, from the inlet modules. It uses this data to determine the access schedule to the middle buffers, for each inlet module.

As mentioned earlier, the number of optical nodes per ring should be relatively small, because the efficiency of the ring drops as the number of the optical nodes increases. In order to increase the overall capacity, however, similarly configured multiple rings may be operated in parallel, and each electronic switch may access each of the rings. FIG. 18 shows the case of an electronic switch interfacing an optical core. The optical core comprises multiple sets of dual rings 300. Each set of dual rings has multiple optical-node groups 302. Full connectivity is realized by multiple electronic switches 304 connecting one or more optical nodes of each group of dual rings.

Referring to FIG. 6, the dual ring shown therein uses two WDM fiber links and the two links carry channels with identically-defined wavelengths to interconnect the seven optical nodes. Six wavelengths are added and six wavelengths are dropped at each optical node. For brevity, the dual ring is hereafter referenced as a ring and the set of wavelength added or dropped at each optical node is referenced as a channel set. A channel set is the minimum number of channels needed in each direction in the ring to ensure full connectivity within the ring. A fully-connected multi-ring network is arranged as a number $S$ of ring sets, each ring set containing $D$ rings. With each ring having $T$ optical nodes (ADMs for example), the total number of rings in the network is $S \times D$ and the total number of optical nodes is then $S \times D \times T$. Each switch is paired with an optical-node group of $D$ optical nodes belonging to $D$ different rings of the same ring set. In a uniform structure, $D=S$. The electronic switches are divided into $T$ switch sets, with each switch set containing $S$ switches. The selection of the members of each switch set is based on topological and traffic-load considerations and is not discussed in this disclosure. Each electronic switch interfaces with the network core through $S$ outgoing links or virtual links and $S$ incoming links or virtual links. A link carries a number of channels and a virtual link constitutes a subset of the channels of a link. Each electronic switch $X$ is associated with an optical-node group in a ring set $X$. The network delivers data to an electronic switch exclusively through its associated ring set. Each electronic switch sends its data to the network through at least $S$ links or virtual links. Each electronic switch has at least one outgoing link or virtual link to a selected optical node in each ring set, with said link or virtual link carrying a channel set matching the wavelength set used in the accessed optical node. In addition to the matching wavelength set, the link or virtual link emanating from a given electronic switch $X$ belonging to a switch set $Y$ carries an extra channel to be routed to the other switches of switch set $Y$. Thus, with $T=7$, as is the case of the example of FIG. 6, the link or virtual link from switch $X$ to an optical node belonging to the ring set associated with switch $X$ carries a channel set of six wavelengths while the link or virtual link from switch $X$ to optical nodes belonging to ring sets other than ring set $X$ carries a set of seven wavelengths. Thus, the total number of channels outgoing from an electronic switch to the optical core is $S \times T - 1$.

FIG. 19 depicts one embodiment of the multi-ring architecture described thus far in which a ring set comprises eight rings (S=8), with each ring connecting seven optical nodes (T=7). There are seven,optical-node groups, each of which may be associated with an electronic switch. FIG. 20 hides the details of FIG. 19 and shows only the seven optical-node groups in the ring set. There is a direct link or virtual link from each optical node in an optical-node group to the electronic switch associated with the optical-node group. One of the links or virtual links carries T−1 channels and each of the remaining S−1 links or virtual links carries T channels. FIG. 21 shows the optical core of a network of eight ring sets (S=8) and depicts a cluster of S optical-node groups. It may be efficient to connect a cluster of S optical-node groups with their S associated switches using a global channel shuffler rather than using individual fibers. This is particularly the case with dense WDM fiber links.

FIG. 22 illustrates the channel connectivity within an optical node 320 where the fiber link 322 incoming from the associated electronic switch carries six channels, and the fiber link 324 from the optical node 320 to the associated electronic switch carries six channels. Of the six incoming channels from the electronic switch, three are inserted in the clockwise half 326 of the dual ring, and the other three are inserted in the counterclockwise half 328. Of the six channels incoming from the clockwise ring 330, three are dropped to the fiber link 324 bound to the associated electronic switch, and the other three remain in the ring, proceeding to the next optical node. The channels incoming from the counterclockwise half 332 of the ring are treated likewise. It is noted that wavelength conversion is not required when the wavelengths are assigned properly.

Similarly, FIG. 23 shows the channel connectivity within an optical node 340 where the incoming fiber link 342 from another counterpart electronic switch carries seven channels, six to be distributed to the other six optical nodes of the dual ring, and one channel to be inserted in the fiber link 344 bound to the associated electronic switch. Like elements in FIG. 23 are designated by like numerals used in FIG. 22. Fiber link 344 carries seven channels, six from the six optical nodes of the dual ring to which it belongs, and one from the incoming fiber link 342.

FIG. 24 shows the connectivity of an electronic switch 430 and a set of eight dual rings 432 associated with the electronic switch 430. The electronic switch 430 receives its incoming traffic from its sources through link 434, and from its associated dual rings 432 through an ADM 436. The electronic switch transmits traffic to one of its associated dual rings through a six-channel fiber link 438. It also transmits traffic through fiber links 442, each of which carries seven channels. Each fiber link 442 connects to a single optical port in a dual ring associated with another counterpart electronic switch. Each fiber link 444 carries traffic from a counterpart electronic switch to a dual ring associated with the electronic switch 430. All incoming traffic to the switch 430 is received through the fiber links 440.

FIG. 25 shows schematically the connectivity of the entire network. In the figure, each electronic switch 550 is associated with a set 552 of eight associated dual rings 554 and each dual ring 554 is represented by a line connecting a number of optical nodes 556. If there are seven optical nodes per dual ring, then each set 552 of associated dual rings connect to seven electronic switches.

The optical nodes associated with an electronic switch should preferably be collocated with the switch, since they all deliver their traffic directly to the switch through links 440 of FIG. 24.

In the example of FIG. 25, S=8, T=7, and the number of outgoing channels from each electronic switch to the optical core is 55. The inner capacity of the network is then 55×56 channels, and assuming a channel capacity of 10 Gb/s, the inner network capacity is 30.8 Tera bits per second, with a corresponding outer capacity (the capacity available to users) of about 20.5 Tera bits per second. The capacity increases quadratically with the number of core-interface channels of the electronic switch and linearly with the capacity R of each channel. With S=20, T=7, and R=10 Gb/s, the inner capacity is 139×140×10 Gb/s (194.6 Tb/s), and the corresponding outer capacity would be about 128 Tb/s. (The outer capacity is estimated to be two thirds of the inner capacity.)

FIG. 26 shows an alternative access to the optical core where seven global optical nodes 610 are used to connect the electronic switches 612 to the rings 614. There are seven optical nodes in each ring. As mentioned above, if each optical node 616 is to have at least a single direct optical channel to each other optical node, then the number of channels from the electronic edge switches 612 to each optical node 616 should be at least six. The capacity increment per ring is preferably an integer multiple of six. The electronic edge switches in FIG. 18 or FIG. 26 may be spread over a wide area, possibly covering the North-American continent for example. In a WDM application, each electronic edge switch may connect to the global optical node 610 (wavelength multiplexer/demultiplexer) by a small number of WDM fibers. Similarly, the global optical node may connect to each of its designated rings by one or more fiber links, each supporting multiple wavelengths. In a symmetrical configuration, and with a single-fiber connection from each electronic edge switch to its global optical node, the number of electronic switches should be seven times the number of rings G, assuming seven optical nodes per ring. Seven global optical nodes 610 may be used to interconnect the electronic switches to the ring optical nodes. The electronic switches are divided into seven subsets, each containing G switches, and each global optical node may serve one of the switch subsets. If, for example, G=20, and the number of channels, L, from each electronic edge switch to its global optical node, is 120, then the total number of channels shuffled by each global optical node is 2400 and the total inner capacity of the optical core is 16800 channels (7 global optical nodes with 2400 channels each). With a typical 10 Gb/s per channel, the inner capacity is about 168 Tb/s. The corresponding end-to-end (outer) capacity would typically be about 112 Tb/s (reduced from 168 Tb/s due to the possible use of two-link paths as mentioned earlier). Several variations of this configuration can be devised depending on the interconnection pattern between the electronic edge switches, the global optical nodes, and the individual rings. The capacity limit of the network increases quadratically with the capacity of the electronic edge switches; it is the electronic edge switch, not the optical core that limits the capacity of the network.

The schematic of FIG. 18 or FIG. 26 does not show the geographic locations of the individual network components. FIG. 26 may be redrawn in the form of the configuration of FIG. 27. In FIG. 27, seven global optical nodes 750 interconnect eight rings through their associated optical nodes 754, each ring having seven optical nodes. Only two global nodes 750 are illustrated as being connected to rings via optical nodes, one by-solid lines and another by dotted lines. Each of the electronic switches 756(corresponds to switch 612 in FIG. 26), shown as small rectangles, connects to a global optical node by one or more optical fibers (not shown in FIG. 27). Each electronic edge switch can reach each other electronic edge switch through the optical core by a single hop or a two-hop path. An electronic edge switch can send all its traffic to a specific electronic switch via the multiplicity of alternate routes.

According to another aspect, the architecture of the invention significantly simplifies multicasting. FIGS. 28 and 29 show two of numerous efficient multicasting patterns. An originating electronic edge switch can fan-out directly to each other electronic edge switches. In FIG. 28, node B multicasts to nodes A, C, D and E as shown by arrowheaded lines. The total number of hops is then v, where v is the number of receiving electronic edge switches for a given multicast connection. In FIG. 29, the originating electronic edge switch may transfer its multicast data to another relay electronic edge switch, which performs direct multicasting to the remaining receiving electronic edge switches. The total number of hops to effect the multicast is still the minimum of v. In fact, the property of conserved number of hops in this scheme can be exploited to minimize the overall multicast resource consumption by selecting the appropriate relay node which minimizes the sum of the distances to the receiving electronic edge switches. A number of relay nodes may also be used.

We claim:

1. A large scale communications network comprising:
 (a) a passive optical core transport network comprising a plurality of optical nodes interconnected by optical links, each of said optical links supporting at least one dedicated channel, said optical nodes managing said dedicated channels to form a fully meshed transport network; and
 (b) a plurality of electronic edge switches, each communicating with one of the plurality of optical nodes;
 wherein a source electronic edge switch processing digital traffic forms at least one path through at least one of said dedicated channels to a destination electronic edge switch.

2. The communications network of claim 1 wherein each of said optical links supports multiple wavelengths, wherein one of said wavelengths constitutes one of said dedicated channels.

3. The communications network of claim 1 wherein the plurality of optical nodes is taken from the group consisting of optical shufflers, add/drop multiplexers and optical space switches.

4. The communications network of claim 3, wherein said source electronic edge switch is operable to send data to said destination electronic edge switch through a direct path and any of (N–2) two-hop paths, wherein N is a number greater than unity and represents the number of said electronic edge switches.

5. In the communications network of claim 4, a method for selecting a path of a prescribed capacity requirement from said source electronic edge switch to said destination electronic edge switch, the method comprising:
 (a) determining a cost-index for each path from said source electronic edge switch to said destination edge switch;
 (b) determining the vacancy of each path from said source electronic edge switch to said destination electronic edge switch;
 (c) computing a weighted vacancy for each path from said source electronic edge switch to said destination edge switch; and
 (d) selecting the path of highest weighted vacancy that has a sufficient vacancy to accommodate said prescribed capacity requirement.

6. The method of claim 5 wherein said cost index is proportional to the inverse of an end-to-end cost.

7. The method of claim 5 wherein the group of possible paths from said source electronic edge switch to said destination edge switch includes a direct path and (N–2) two-hop paths.

8. The method of claim 7 including the further step of selecting the direct path over any of said (N–2) two hop paths if said direct path has a sufficient vacancy to accommodate said prescribed capacity requirement.

9. A communications network for transporting digital traffic between a plurality of electronic edge switches through channels in a fully meshed logical configuration, comprising an optical core transport network including a dual ring carrying multiple wavelengths in opposite directions with specifically assigned wavelengths for each specified pair of said plurality of electronic edge switches.

10. The communications network according to claim 9 wherein source and destination electronic edge switches selected from the plurality of electronic edge switches, are connected by a direct path and a plurality of indirect paths.

11. The communications network according to claim 9 wherein said dual ring comprises:
 (a) a clockwise ring and a counter-clockwise ring, each having a plurality of optical channels; and
 (b) a plurality of optical add/drop multiplexers;
 wherein each of said optical add/drop multiplexers is connected to said clockwise and counter-clockwise rings and is operable to:
  (i) insert optical channels incoming from each of said plurality of electronic edge switches to optical channels in said clockwise and counter-clockwise rings;
  (ii) drop optical channels received from said clockwise and counter-clockwise rings to a fiber link bound to each of said plurality of electronic edge switches;
  (iii) pass optical channels received from said clockwise ring to a specified one of the plurality of optical add/drop multiplexers; and
  (iv) pass optical channels received from said counter-clockwise ring to a specified one of the plurality of optical add/drop multiplexers.

12. In the communications network according to claim 11, a method of allocating optical channels of different wavelengths, the method including a step of assigning unique wavelengths: in any ring section between successive add/drop multiplexers in the clockwise ring; in any ring section between successive add/drop multiplexers in the counter-clockwise ring; in the fiber link from an electronic edge switch to an optical add/drop multiplexer; and in the fiber link from an optical add/drop multiplexer to an electronic edge switch.

13. The communications network according to claim 11 wherein said dual ring comprises seven optical add/drop multiplexers, and each of said fiber links connecting said electronic edge switches to associated add/drop multiplexers carries six optical channels in each direction, and wherein said six optical channels provide:
 (a) three channels incoming from said electronic edge switch which are inserted in the clockwise ring and three channels which are inserted in the counter-clockwise ring;
 (b) three channels incoming from said clockwise ring which are dropped to the fiber link bound to one of said electronic edge switches, and three channels which proceed to an adjacent optical add/drop multiplexer; and (c) three channels incoming from the counter-clockwise ring which are dropped to the fiber link bound to one of said electronic edge switches and three channels which proceed to an adjacent optical add/drop multiplexer.

14. A multi-ring network comprising:

(a) a plurality of electronic edge switches; and (b) a number D of dual rings, each dual ring interconnecting at least T optical nodes;

wherein each of said plurality of electronic edge switches has a wavelength division multiplexing fiber link to one of said at least T optical nodes in each of said D dual rings and a wavelength division multiplexing fiber link from one of said at least T optical nodes;

and wherein each of said at least T optical nodes within a specified dual ring is operable to connect optical channels of a wavelength division multiplexing fiber link to the remaining ones of said at least T optical nodes within said specified dual ring;

and wherein each of said electronic edge switches is operable to direct data through said optical channels to any other of said plurality of electronic edge switches.

15. The network of claim 14 wherein each of said dual rings has the same number T of optical nodes.

16. The network of claim 14 wherein each of said electronic edge switches is connected to at least one of said T optical nodes in each of said dual rings.

17. The network of claim 14 wherein the paths interconnecting any two of the plurality of electronic edge switches comprises at least D optical channels.

18. The network of claim 14 wherein each optical node is an optical add/drop multiplexer.

19. A multi-ring network comprising:

(a) a plurality of edge switches;

(b) an optical core comprising a plurality of dual rings, each of said dual rings including T optical nodes;

wherein said plurality of dual rings is arranged into S ring sets;

and wherein each of said ring sets comprises D dual rings;

and wherein each of said plurality of edge switches transmits data to at least one of said S ring sets;

and wherein each of said plurality of edge switches receives data through specified ones of D optical nodes belonging to a specified one of said S ring sets.

20. The multi-ring network of claim 19 wherein each of said plurality of edge switches has a fiber link to a specified one of said T optical nodes in each of said S ring sets and a fiber link from each of said D optical nodes of a specified one of said S ring sets.

21. The multi-ring network of claim 20 wherein each edge switch is associated with a group of D optical nodes belonging to said D dual rings of the same ring set.

22. The multi-ring network of claim 21 wherein the network includes S×D×T optical nodes.

23. The multi-ring network of claim 22 wherein the number D of dual rings per ring set equals the number S of ring sets.

24. The multi-ring network of claim 23 wherein each of said dual rings has T optical nodes and the network includes S×T edge switches.

25. An edge switch communicating with an optical core transport network for exchanging digital traffic with other edge switches in a meshed logical configuration, comprising:

(a) at least two ingress ports;

(b) at least two egress ports communicating with said at least two ingress ports;

wherein said edge switch communicates with a passive optical core transport network via one of the at least two ingress and egress ports, said transport network comprising a plurality of optical nodes fully interconnected by optical links, each of said optical links supporting at least one dedicated channel, said optical nodes managing said dedicated channels to form a fully meshed transport network;

and wherein said edge switch further includes means for selecting a desired dedicated channel to exchange digital traffic with a specified destination edge switch.

26. The edge switch of claim 23 wherein the edge switch is operable to send data to said destination edge switch through a direct path and any of (N−2) two-hop paths, wherein N is a number greater than unity and represents the number of said electronic edge switches.

* * * * *